US010632478B2

(12) United States Patent
Hyun et al.

(10) Patent No.: US 10,632,478 B2
(45) Date of Patent: Apr. 28, 2020

(54) DUST COLLECTOR AND CLEANER HAVING THE SAME

(71) Applicant: LG ELECTRONICS INC., Seoul (KR)

(72) Inventors: Kietak Hyun, Seoul (KR); Jungmin Ko, Seoul (KR); Sangchul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 15/940,373

(22) Filed: Mar. 29, 2018

(65) Prior Publication Data
US 2019/0091701 A1    Mar. 28, 2019

(30) Foreign Application Priority Data

Sep. 28, 2017  (KR) .................. 10-2017-0126402

(51) Int. Cl.
*B01D 45/00*  (2006.01)
*B04C 5/26*  (2006.01)
(Continued)

(52) U.S. Cl.
CPC .............. *B04C 5/26* (2013.01); *A47L 5/362* (2013.01); *A47L 9/165* (2013.01); *A47L 9/1608* (2013.01);
(Continued)

(58) Field of Classification Search
CPC .... B04C 5/26; B04C 3/04; B04C 3/06; B04C 5/13; B04C 5/28; B04C 5/185;
(Continued)

(56) References Cited

U.S. PATENT DOCUMENTS 2,553,175 A * 5/1951 Davenport ................ B04C 5/24
55/343
3,074,218 A * 1/1963 O'Dell ...................... B04C 5/28
55/343
(Continued)

FOREIGN PATENT DOCUMENTS

KR          10-0844621         7/2008
KR      10-2010-0093446        8/2010
(Continued)

OTHER PUBLICATIONS

PCT International Search Report dated Feb. 22, 2018 issued in Application No. PCT/KR2017/011379.
(Continued)

*Primary Examiner* — Dung H Bui
(74) *Attorney, Agent, or Firm* — Ked & Associates, LLP

(57) ABSTRACT

A dust collector includes a cylindrical housing forming an outer appearance of the dust collector; a primary cyclone formed inside the housing to cause a swirling flow to separate dust from air introduced into the housing; a secondary cyclone formed with axial inlet type cyclones to receive air and fine dust that have passed through the cyclone, and cause a swirling flow to separate the fine dust from the air; and a mesh provided at an outside surface the secondary cyclone to form a boundary between the primary and the secondary cyclones, wherein the axial inlet type cyclones includes a first group stacked in multiple stages, an inlet of which is arranged toward the mesh; and a second group provided on one side and the other side of the first group, respectively, an inlet and an outlet of which face a height direction of the dust collector.

20 Claims, 15 Drawing Sheets

(51) Int. Cl.

| | | |
|---|---|---|
| *A47L 9/16* | (2006.01) | |
| *B04C 5/06* | (2006.01) | |
| *B01D 45/16* | (2006.01) | |
| *B04C 5/185* | (2006.01) | |
| *B04C 5/28* | (2006.01) | |
| *B04C 5/13* | (2006.01) | |
| *A47L 5/36* | (2006.01) | |
| *B04C 3/06* | (2006.01) | |
| *B04C 3/04* | (2006.01) | |

(52) U.S. Cl.
CPC ........... *A47L 9/1625* (2013.01); *A47L 9/1641* (2013.01); *A47L 9/1666* (2013.01); *A47L 9/1683* (2013.01); *B01D 45/16* (2013.01); *B04C 3/04* (2013.01); *B04C 3/06* (2013.01); *B04C 5/06* (2013.01); *B04C 5/13* (2013.01); *B04C 5/185* (2013.01); *B04C 5/28* (2013.01); *A47L 2201/00* (2013.01)

(58) Field of Classification Search
CPC ........ B04C 5/06; A47L 9/1683; A47L 9/1608; A47L 9/1666; A47L 5/362; A47L 9/165; A47L 9/1641; A47L 9/1625; A47L 2201/00; B01D 45/16
See application file for complete search history.

(56) References Cited

U.S. PATENT DOCUMENTS

| | | | | |
|---|---|---|---|---|
| 3,375,058 A | * | 3/1968 | Petersen | C01B 17/76 423/2 |
| 3,386,588 A | * | 6/1968 | Ades | B04C 5/28 210/512.2 |
| 3,425,192 A | * | 2/1969 | Davis | A47L 9/1641 55/345 |
| 3,541,766 A | * | 11/1970 | Wilson | B01J 8/005 55/348 |
| 3,747,306 A | * | 7/1973 | Wikdahl | B01D 53/24 55/349 |
| 3,915,679 A | | 10/1975 | Roach | |
| 4,537,608 A | | 8/1985 | Koslow | |
| 4,702,846 A | | 10/1987 | Ryynanen | |
| 5,129,124 A | * | 7/1992 | Gamou | A47L 5/14 15/352 |
| 5,403,367 A | | 4/1995 | De Villiers | |
| 5,681,450 A | * | 10/1997 | Chitnis | B01J 8/0055 208/100 |
| 7,462,212 B2 | * | 12/2008 | Han | A47L 9/1625 55/343 |
| 7,655,058 B2 | * | 2/2010 | Smith | A47L 9/165 15/353 |
| 7,770,256 B1 | | 8/2010 | Fester | |
| 7,799,106 B2 | | 9/2010 | Rother | |
| 7,803,205 B2 | * | 9/2010 | Oh | A47L 9/122 55/337 |
| 7,976,597 B2 | * | 7/2011 | Smith | A47L 9/1625 15/352 |
| 8,101,001 B2 | * | 1/2012 | Qian | A47L 9/1625 15/353 |
| 8,262,761 B2 | | 9/2012 | Babb | |
| 8,657,904 B2 | | 2/2014 | Smith | |
| 8,914,941 B2 | | 12/2014 | Kim | |
| 2003/0057151 A1 | * | 3/2003 | Kopec | B01D 45/12 210/512.2 |
| 2007/0234691 A1 | * | 10/2007 | Han | A47L 9/1608 55/457 |
| 2008/0190080 A1 | * | 8/2008 | Oh | A47L 9/1625 55/343 |
| 2009/0031524 A1 | * | 2/2009 | Courtney | A47L 9/1625 15/347 |
| 2009/0265883 A1 | | 10/2009 | Reed | |
| 2010/0005617 A1 | | 1/2010 | Hyun et al. | |
| 2010/0115727 A1 | * | 5/2010 | Oh | A47L 9/1625 15/347 |
| 2010/0275561 A1 | | 11/2010 | Lundquist | |
| 2013/0031878 A1 | | 2/2013 | Menssen | |
| 2013/0255203 A1 | * | 10/2013 | Muenkel | B01D 46/0021 55/337 |
| 2014/0373490 A1 | * | 12/2014 | Wuebbeling | B01D 45/16 55/345 |
| 2016/0088988 A1 | | 3/2016 | Eo | |
| 2017/0247896 A1 | * | 8/2017 | Hayes | B04C 5/24 |

FOREIGN PATENT DOCUMENTS

| | | |
|---|---|---|
| KR | 10-2015-0031304 | 3/2015 |
| KR | 10-2015-0109045 | 10/2015 |
| KR | 10-2016-0089201 | 7/2016 |

OTHER PUBLICATIONS

PCT International Search Report dated Feb. 22, 2018 issued in Application No. PCT/KR2017/011380.
PCT International Search Report dated Feb. 22, 2018 issued in Application No. PCT/KR2017/011381.
PCT International Search Report dated Feb. 22, 2018 issued in Application No. PCT/KR2017/011382.
United States Office Action dated Jan. 6, 2020 issued in U.S. Appl. No. 15/941,181.
United States Notice of Allowance dated Feb. 5, 2020 issued in U.S. Appl. No. 15/941,388.

* cited by examiner

US 10,632,478 B2

DUST COLLECTOR AND CLEANER HAVING THE SAME

CROSS-REFERENCE TO RELATED APPLICATION

This application claims priority under 35 U.S.C. § 119 to Korean Application No. 10-2017-0126402, filed on Sep. 28, 2017, whose entire disclosure is hereby incorporated by reference.

BACKGROUND

1. Field

The present disclosure relates to a vacuum cleaner for sucking air and dust using a suction force, separating dust from the sucked air to collect dust, and discharging only clean air, and a dust collector provided in the vacuum cleaner.

2. Background

A vacuum cleaner refers to a device for sucking dust and air using a suction force generated by a suction motor mounted inside a cleaner body, and separating and collecting dust from the air.

Such vacuum cleaners are classified into a canister cleaner, an upright cleaner, a stick cleaner, a handy cleaner, and a robot cleaner. In case of the canister cleaner, a suction nozzle for suctioning dust is provided separately from a cleaner body, and the cleaner body and the suction nozzle are connected to each other by a connecting device. In case of the upright cleaner, the suction nozzle is rotatably connected to the cleaner body. In case of the stick cleaner and the handy cleaner, a user uses the cleaner body while holding it with his or her hand. However, in case of the stick cleaner, the suction motor is provided close to the suction nozzle (lower center), and in case of the handy vacuum cleaner, the suction motor is provided close to a grip portion (upper center). The robot cleaner performs cleaning by itself while traveling through an autonomous driving system.

There are currently disclosed many vacuum cleaners employing a multi-cyclone. Cyclone refers to a device for forming a swirling flow in a fluid and separating air and dust from each other using a centrifugal force difference resulting from a weight difference between the air and the dust. The term "multi-cyclone" refers to a structure for separating air and dust from each other using a primary cyclone, and separating air and fine dust from each other using a plurality of secondary cyclones. Here, dust and fine dust are classified by size.

For example, Korean Patent Laid-Open Publication No. 10-2015-0031304 (Mar. 23, 2015) discloses a cleaning device employing a multi-cyclone. The dust and fine dust which are introduced into an inside of the body along with the air are sequentially separated from the air by the primary cyclone and the secondary cyclones. A vacuum cleaner employing a cyclone has an advantage of not requiring a separate replaceable dust bag.

A cone structure is formed particularly in a body (cylinder) of a secondary cyclone in a multi-cyclone. The cone denotes a shape in which a cross-sectional area of the secondary cyclone becomes smaller toward one side. The air and fine dust introduced into the secondary cyclone are separated from each other in the secondary cyclone. The fine dust is discharged to a fine dust outlet along the cone, and the air is discharged to an air outlet formed in a direction opposite to an outlet of the fine dust.

Such a structure has a problem of causing flow loss. As a flow direction of the air changes frequently, flow loss occurs because an inlet of the secondary cyclone and the air outlet are formed on the same side with each other. The air is introduced into the inlet of the secondary cyclone, changes its direction within the secondary cyclone, and discharged again to the air outlet, thereby causing flow loss during the process.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, and wherein.

DETAILED DESCRIPTION

Figure 1:
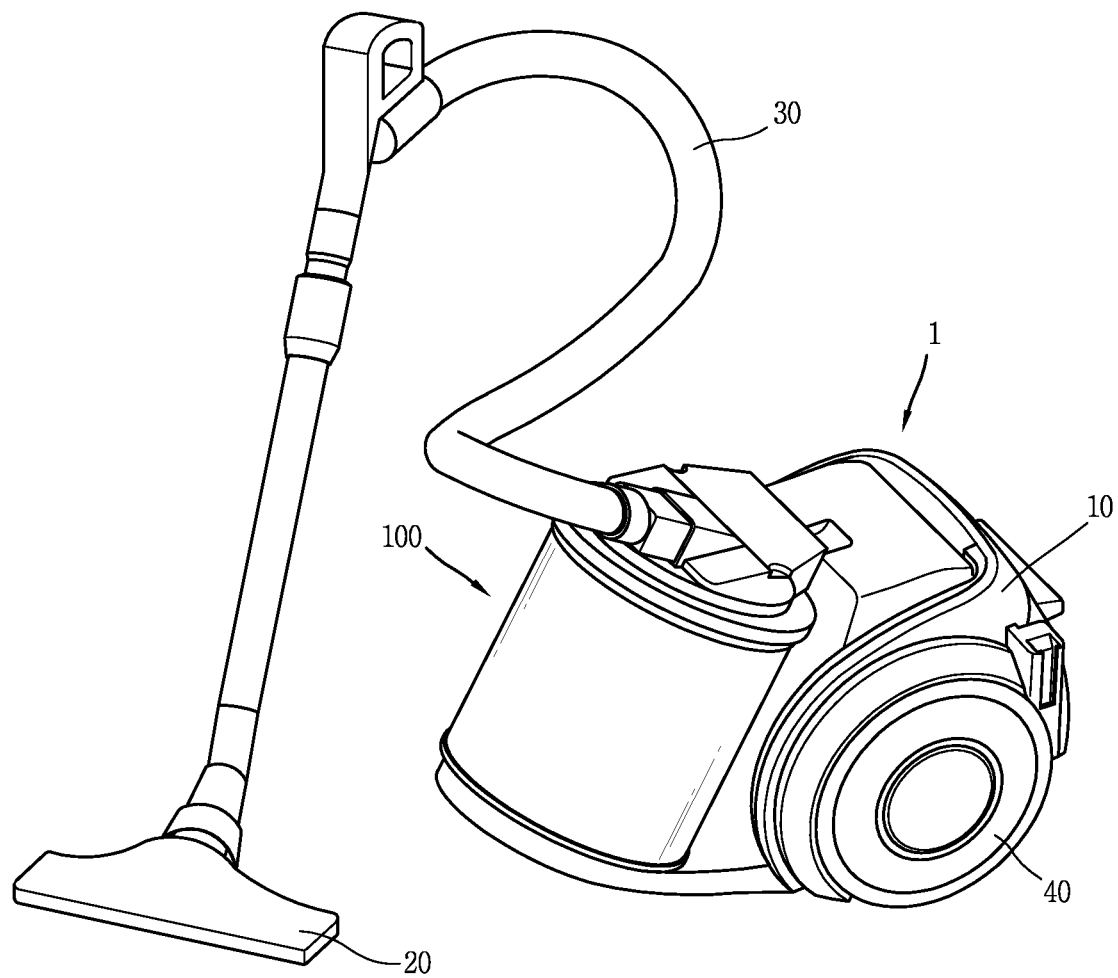
FIG. 1 is a perspective view illustrating an example of a canister type cleaner associated with the present disclosure.

Hereinafter, a dust collector associated with the present disclosure will be described in more detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

For reference, a dust collector 100 applied to a canister-type vacuum cleaner 1 is illustrated in the present drawing, but the dust collector 100 of the present disclosure is not necessarily limited to the canister-type vacuum cleaner 1. For example, the dust collector 100 of the present disclosure may also be applicable to an upright type vacuum cleaner, and the dust collector may be applicable to all types of vacuum cleaners.

FIG. 1 is a perspective view illustrating an example of a canister type vacuum cleaner 1 associated with the present disclosure. Referring to FIG. 1, the vacuum cleaner 1 includes a cleaner body 10, a suction nozzle (or suction head) 20, a connecting unit (or connection hose) 30, a wheel unit (or wheel) 40, and a dust collector 100.

The cleaner body 10 has a suction unit (not shown) for generating a suction force. The suction unit includes a suction motor and a suction fan rotated by the suction motor to generate a suction force.

The suction nozzle 20 is configured to suck air and foreign substances adjacent to the suction nozzle 20. Here, foreign substances have a concept referring to substances other than air, and including dust, fine dust, and ultra-fine dust. Dust, fine dust, and ultra-fine dust are classified by size, and fine dust is smaller than dust and larger than ultra-fine dust.

The connecting unit 30 is connected to the suction nozzle 20 and the dust collector 100, respectively, to transfer air containing foreign matter, dust, fine dust, ultra-fine dust, and the like, sucked through the suction nozzle 20, to the dust collector 100. The connecting unit 30 may be configured in the form of a hose or pipe.

The wheel unit 40 is rotatably coupled to the cleaner body 10 to move or rotate the cleaner body 10 in every direction. For an example, the wheel unit 40 may include main wheels and an auxiliary wheel. The main wheels may be respectively provided on both sides of the cleaner body 10, and the auxiliary wheel may be configured to support the main body 10 together with the main wheels, and assist the movement of the cleaner body 10 by the main wheels.

In the present disclosure, the suction nozzle 20, the connecting unit 30, and the wheel unit 40 may be applicable to a vacuum cleaner in the related art as they are, and thus a more detailed description thereof will be omitted.

The dust collector 100 is detachably coupled to the cleaner body 10. The dust collector 100 is configured to separate and collect foreign matter from air sucked through the suction nozzle 20, and discharge the filtered air.

The vacuum cleaner in the related art has a structure in which the connecting unit is connected to the suction unit formed in the cleaner body, and air suctioned through a flow guide extended from the suction unit to the dust collector is introduced back into the dust collector. The sucked air is introduced into the dust collector by a suction force of the suction unit. However, there is a problem that the suction force is reduced while passing through the flow guide of the vacuum cleaner body.

On the contrary, in the vacuum cleaner 1 of the present disclosure, the connecting unit 30 is directly connected to the dust collector 100 as illustrated in the drawing. According to such a connection structure, air sucked through the suction nozzle 20 flows directly into the dust collector 100 to enhance the suction force compared to the related art. Furthermore, there is an advantage of not requiring the formation of a flow guide inside the cleaner body 10.

Figure 2:
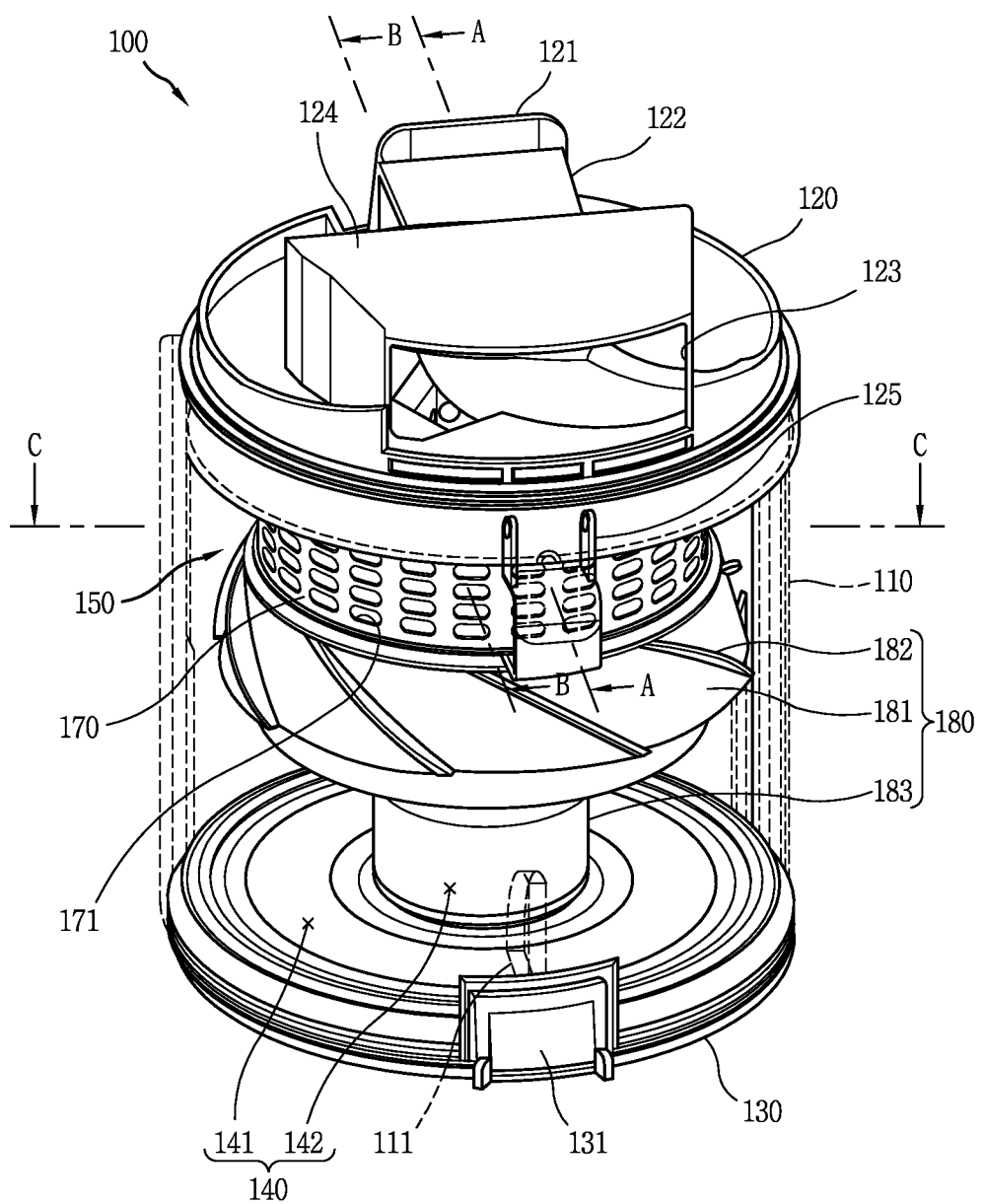
FIG. 2 is a perspective view of the dust collector illustrated in FIG. 1.
Figure 3:
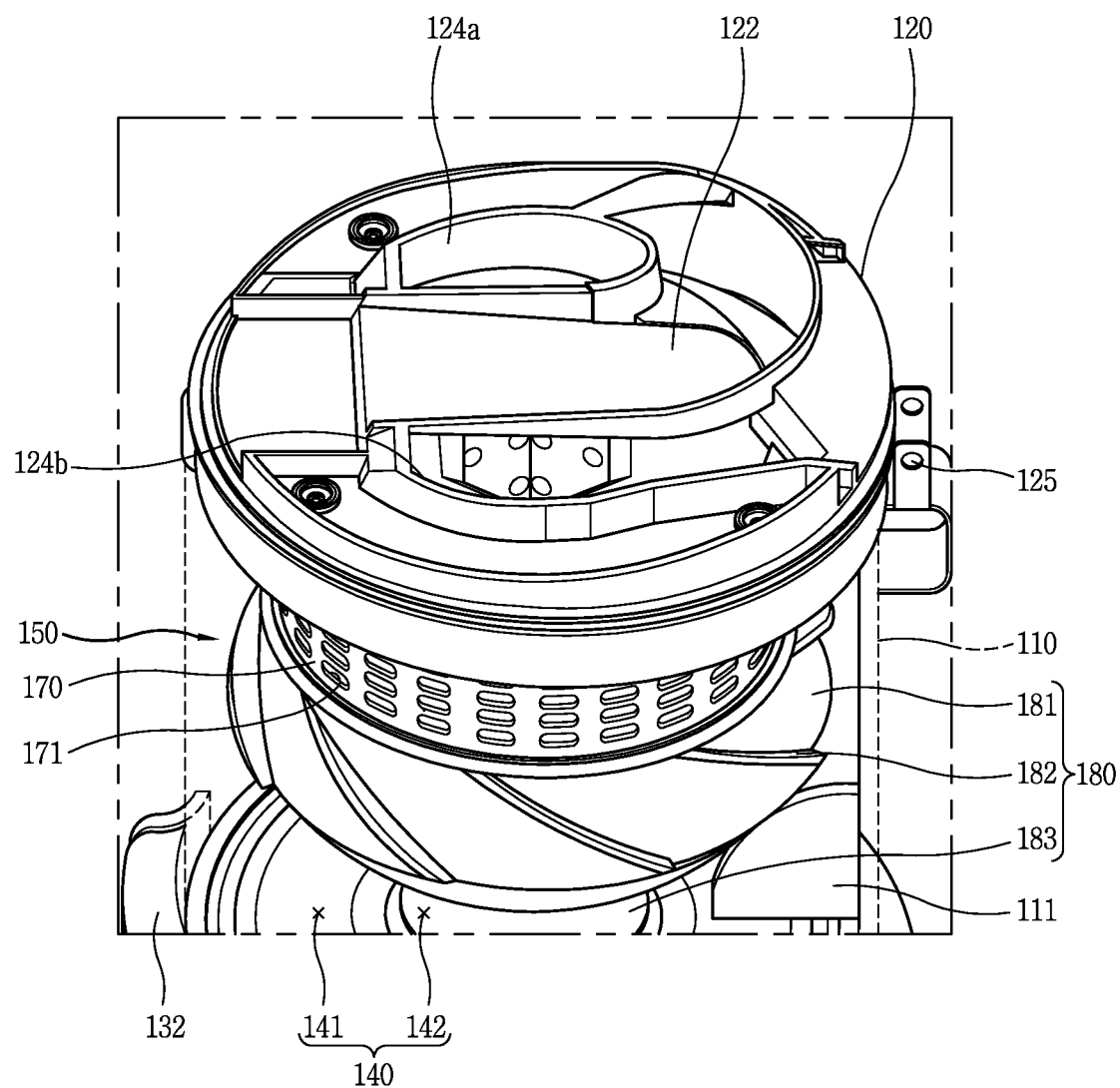
FIG. 3 is a perspective view illustrating a shape in which an upper portion of the dust collector illustrated in FIG. 2 is cut.

Hereinafter, the dust collector 100 will be described. FIG. 2 is a perspective view of the dust collector 100 illustrated in FIG. 1, and FIG. 3 is a perspective view illustrating a shape in which an upper portion of the dust collector 100 illustrated in FIG. 2 is cutout. The dust collector 100 refers to a device for separating and collecting foreign matter (dust, fine dust, ultra-fine dust, etc.) from air sucked through the suction nozzle 20. The air flows along a flow path inside the dust collector 100 by a suction force generated by the suction unit, and the foreign matter is separated from the air by the structure of the dust collector 100 during the flow.

An outer appearance of the dust collector 100 is formed by a housing 110, an upper cover 120, and a lower cover 130. The housing 110 forms a lateral appearance of the dust collector 100. The housing 110 is configured to accommodate internal components of the dust collector 100, such as a primary cyclone unit (or cyclone) 150, a secondary cyclone unit (or secondary cyclone) 160 (see FIG. 5), a mesh 170, and the like. The housing 110 may be formed in a cylindrical shape in which a top and a bottom thereof are open, but is not limited thereto.

The upper cover 120 is coupled to an upper portion of the housing 110. The upper cover 120 may be rotatably coupled to the housing 110 by a hinge 125. When it is required to open the upper cover 120 and clean an inside of the dust collector 100, the upper cover 120 may be rotated about the hinge 125 to open an upper opening of the housing 110.

An inlet 121 and an outlet 123 of the dust collector 100 may be respectively formed on the upper cover 120. Referring to FIG. 2, the inlet 121 of the dust collector 100 may be formed on one side of the upper cover 120, and the outlet 123 of the dust collector 100 may be formed on the other side of the upper cover 120.

The inlet 121 of the dust collector 100 is connected to the suction nozzle 20 by the connecting unit 30. Therefore, air and foreign matter introduced through the suction nozzle 20 flow into the dust collector 100 through the connecting unit 30. Furthermore, the outlet 123 of the dust collector 100 is connected to an internal flow path of the cleaner body 10. Accordingly, the air separated from the foreign matter by the dust collector 100 passes through the internal flow path of the cleaner body 10 and is discharged to an outside of the cleaner body 10.

The upper cover 120 may be formed with an intake guide 122 and an exhaust guide 124, respectively. The intake guide 122 is formed on a downstream side of the inlet 121 and connected to an inside of the dust collector 100. The intake guide 122 extends downward from the center of the upper cover 120 to an inner circumferential surface of the housing 110 along a spiral direction. Therefore, the air guided by the intake guide 122 flows in a tangential direction toward the inner circumferential surface of the housing 110. Accordingly, a swirling flow is naturally formed in the air flowing into an inside of the housing 110.

The exhaust guide 124 is formed around the intake guide 122. The intake guide 122 and the exhaust guide 124 are partitioned from each other by a structure of the upper cover 120. The exhaust guide 124 may have a structure in which two branched paths 124a, 124b formed at both sides of the intake guide 122 are integrated into one path, and the outlet 123 of the dust collector 100 is formed on a downstream side of the exhaust guide 124.

A first dust collection unit (or first dust collection chamber) 141 for collecting dust and a second dust collection unit (or second dust collection chamber) 142 for collecting fine dust are formed at an inner side of the housing 110. The first dust collection unit 141 and the second dust collection unit 142 are formed in a region defined by the housing 110, the lower cover 130, and the like.

The first dust collection unit 141 is formed in a ring shape at an inner side of the housing 110. The first dust collection unit 141 is formed to collect dust separated from the air in the primary cyclone unit 150, which will be described later. A partition plate 111 may be formed in the first dust collection unit 141. The partition plate 111 may protrude from an inner circumferential surface of the housing 110 toward a dust collection unit boundary 183.

The second dust collection unit 142 is formed in a region surrounded by the first dust collection unit 141. A cylindrically-shaped dust collection unit boundary 183 may be provided at an inner side of the housing 110 to partition the first dust collection unit 141 and the second dust collection unit 142. An outer side of the dust collecting boundary 183 corresponds to the first dust collection unit 141, and an inner side of the dust collection unit boundary 183 corresponds to the second dust collection unit 142. The second dust collection unit 142 is formed to collect fine dust separated from the air in the second cyclone unit 160.

The lower cover 130 is coupled to a lower portion of the housing 110. The lower cover 130 forms the bottoms of the first dust collection unit 141 and the second dust collection unit 142. The lower cover 130 may be rotatably coupled to the housing 110 by a hinge 131. When required to open the lower cover 130 to discharge the dust collected in the first dust collection unit 141 and the fine dust collected in the second dust collection unit 142, a fastening between the upper cover 110 and the lower cover 130 is released to rotate the lower cover 130 about the hinge 131 so as to open a lower opening portion of the housing 110. The dust collected in the first dust collection unit 141 and the fine dust collected in the second dust collection unit 142 are discharged downward at a time by their respective weights.

The mesh 170 is provided at an inner side of the housing 110. The mesh 170 may be formed in a cylindrical shape having a smaller circumference than the housing 110. A plurality of holes 171 are formed on the mesh 170 and substances are filtered by the mesh 170 if they are larger in size than the holes 171 of the mesh 170.

A skirt 181 may be formed below the mesh 170. The skirt 181 may form a slope being closer to an inner surface of the housing 110 as it approaches the lower cover 130. The skirt 181 serves to prevent scattering of dust collected in the first dust collection unit 141.

Ribs 182 may protrude from an outer circumferential surface of the skirt 181 along a spiral direction. Ribs 182 induce a natural fall of the foreign matter filtered by the mesh 170 to collect the foreign matter in the first dust collection unit 141. Below the skirt 181, the dust collection unit boundary 183 described above is formed.

The skirt 181, the ribs 182, and the dust collection unit boundary 183 may be formed as an integral member. The member may be referred to as an inner housing 180.

The primary cyclone unit 150 is formed at an inner side of the housing 110. Specifically, the primary cyclone unit 150 is formed by a housing 110, a mesh 170, and an intake guide 122 that forms a swirling flow.

The primary cyclone unit 150 generates a swirling flow to separate dust from the air introduced into an inner side of the housing 110. When a suction force provided from the suction motor installed at an inner side of the cleaner body exerts an influence on an inner side of the dust collector 100, the air and the foreign matter swirl in the primary cyclone unit 150.

When a swirling flow is formed in the air and foreign matter sucked in a tangential direction of the primary cyclone unit 150 by the intake guide 122, relatively light air and fine dust flow into the mesh 170 through the hole of the mesh 170. On the contrary, relatively heavy dust flows along an inner surface of the housing 110 and falls to the first dust collection unit 141.

The secondary cyclone unit 160 is provided at an inner side of a region defined by the mesh 170. Hereinafter, the structure of one axial inlet type cyclone 160a belonging to the secondary cyclone unit will be described first, and subsequently the arrangement and operation of the secondary cyclone unit 160 will be described.

Figure 4:
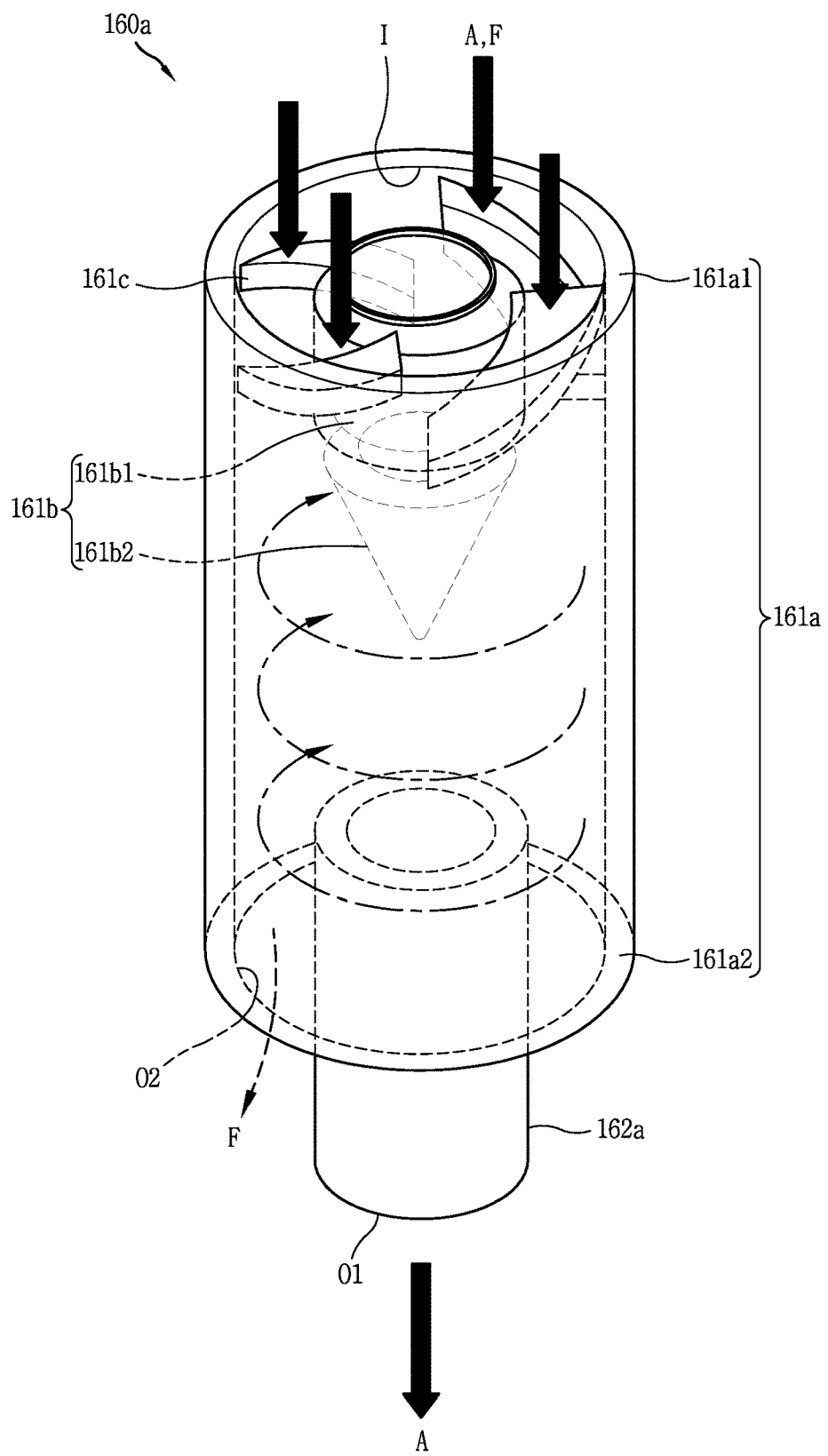
FIG. 4 is a perspective view showing an example of an axial inlet type cyclone.

FIG. 4 is a perspective view illustrating an example of the axial inlent type cyclone 160a. The cyclone is divided into an axial inlet type and a tangential inlet type according to the inflow structure of air. In case of the axial inlet type cyclone, air is introduced along an axial direction of the cyclone, and in case of the tangential inlet type cyclone, air is introduced along a tangential direction of the cyclone.

The axial inlet type cyclone is divided into a cone type and a tube type according to the shape. The cone type has a structure in which the inner diameter gradually decreases in size, while the tube type has a structure in which the inner diameter is constant in size. A cone is provided for the purpose of increasing a centrifugal force through an increase of the rotational speed.

The cone type may have only a reverse flow structure, while the tube type may selectively have either one of a reverse direction and a forward flow structure. The reverse flow structure refers to a structure in which an inlet of air and an outlet of air are open toward the same direction in such a manner that air introduced into the inlet of air reverses the flow direction and is discharged to the outlet of air. In contrast, the forward flow structure refers to a structure in which the inlet of air and the outlet of air are open in opposite directions to each other, and air introduced into the inlet of air is discharged to the outlet of air while maintaining the flow direction.

Since the flow loss (pressure loss) occurs during the reversal of the flow direction, the forward flow structure has an advantage that the flow loss can be suppressed compared to the reverse flow structure. The axial inlet type cyclone 160a described in FIG. 4 corresponds to an axial inlet type, a tube type, and has a forward flow structure.

A plurality of axial inlet type cyclones 160a are gathered to form a secondary cyclone unit 160. The axial inlet type cyclone 160a is supplied with air and fine dust that have passed through the cyclone 150 and the mesh 170. Furthermore, the axial inlet type cyclone 160a causes a swirling flow to separate the fine dust from the air.

The axial inlet type cyclone 160a receives the air (A) and the fine dust (F) along an axial direction. The axial direction refers to a direction extending toward the inlet (I) and the outlets (O1, O2) of the axial inlet type cyclone 160a. When the air and the fine dust are supplied along an axial direction, the flow may be uniformly and symmetrically formed at 360° (degrees), thereby preventing the occurrence of a phenomenon of concentration of the flow in one region.

The axial inlet type cyclone 160a includes a body 161a, a vortex finder 161b, a vane 161c, and an outlet partition portion (or outlet partition) 162a. The body 161a forms an appearance of the axial inlet type cyclone 160a and forms a boundary between an inner side and an outer side of the axial inlet type cyclone 160a. The body 161a is formed in a hollow cylindrical shape, and an inner diameter of the body 161a is constant. One side (upper side of FIG. 4) 161a1 and the other side (lower side of FIG. 4) 161a2 of the body 161a are open. Referring to FIG. 4, the open upper portion 161a1 corresponds to the inlet (I) of the body 161a and the open lower portion 161a2 corresponds to the outlets (O1, O2) of the body 161a. Therefore, the inlet (I) and the outlets (O1, O2) of the body (161a) are open in opposite directions to each other.

A vortex finder 161b is provided at an inlet side 161a1 of the body 161a. The vortex finder 161b includes a first portion 161b1 and a second portion 161b2. The first portion (also referred to as a first surface or inlet partition) 161b1 is formed in a cylindrical shape. Furthermore, the second portion (also referred to as a second surface or inlet cone) 161b2 protrudes from the first portion 161b1 toward the outlets (O1, O2) of the body 161a, and may have a conical or cone shape.

The second portion 161b2 of the axial inlet type cyclone 160a is clogged or blocks an air flow. Therefore, air is not discharged to an inside of the vortex finder 161b. Since the air is not discharged to an inside of the vortex finder 161b, the air does not change the flow direction inside the body 161a.

The vane 161c is formed between an outer circumferential surface of the first portion 161b1 and an inner circumferential surface of the body 161a. There may be provided with a plurality of vanes 161c, and the plurality of vanes 161c extend in a spiral direction. The vortex finder 161b and the vane 161c form a swirling flow of air and fine dust between an outer circumferential surface of the vortex finder 161b and an inner circumferential surface of the body 161a.

The outlets (O1, O2) of the axial inlet type cyclone 160a include an air outlet (O1) and a fine dust outlet (O2). The air outlet (O1) and the fine dust outlet (O2) are open toward the same direction (the outlet side 161a2 of the body 161a). The outlet partition portion 162a is provided on the outlet side 161a2 of the body 161a and formed to partition the air outlet (O1) and the fine dust outlet (O2).

Referring to FIG. 4, the fine dust outlet (O2) is formed in a ring shape around the air outlet (O1). An inner region defined by the outlet partition portion (or outlet partition) 162a corresponds to the air outlet (O1). Furthermore, a region between an outer circumferential surface of the outlet partition portion 162a and an inner circumferential surface of the body 161a corresponds to the fine dust outlet (O2). The outlet partition portion 162a is formed in a cylindrical shape and defines the air outlet (O1) and the fine dust outlet (O2).

Referring to FIG. 4, the body 161a and the vortex finder 161b may be connected to each other by a vane 161c. Therefore, the body 161a, the vortex finder 161b, and the vane 161c may be formed by one member, and this one member may be referred to as a first member 161. On the other hand, the outlet partitioning portion 162a is spaced apart from the body 161a. Therefore, the outlet partition portion 162a is formed by a separate member, and the separate member may be referred to as a second member 162. The axial inlet type cyclones may be formed by a coupling between the first member 161 and the second member 162.

Figure 5:
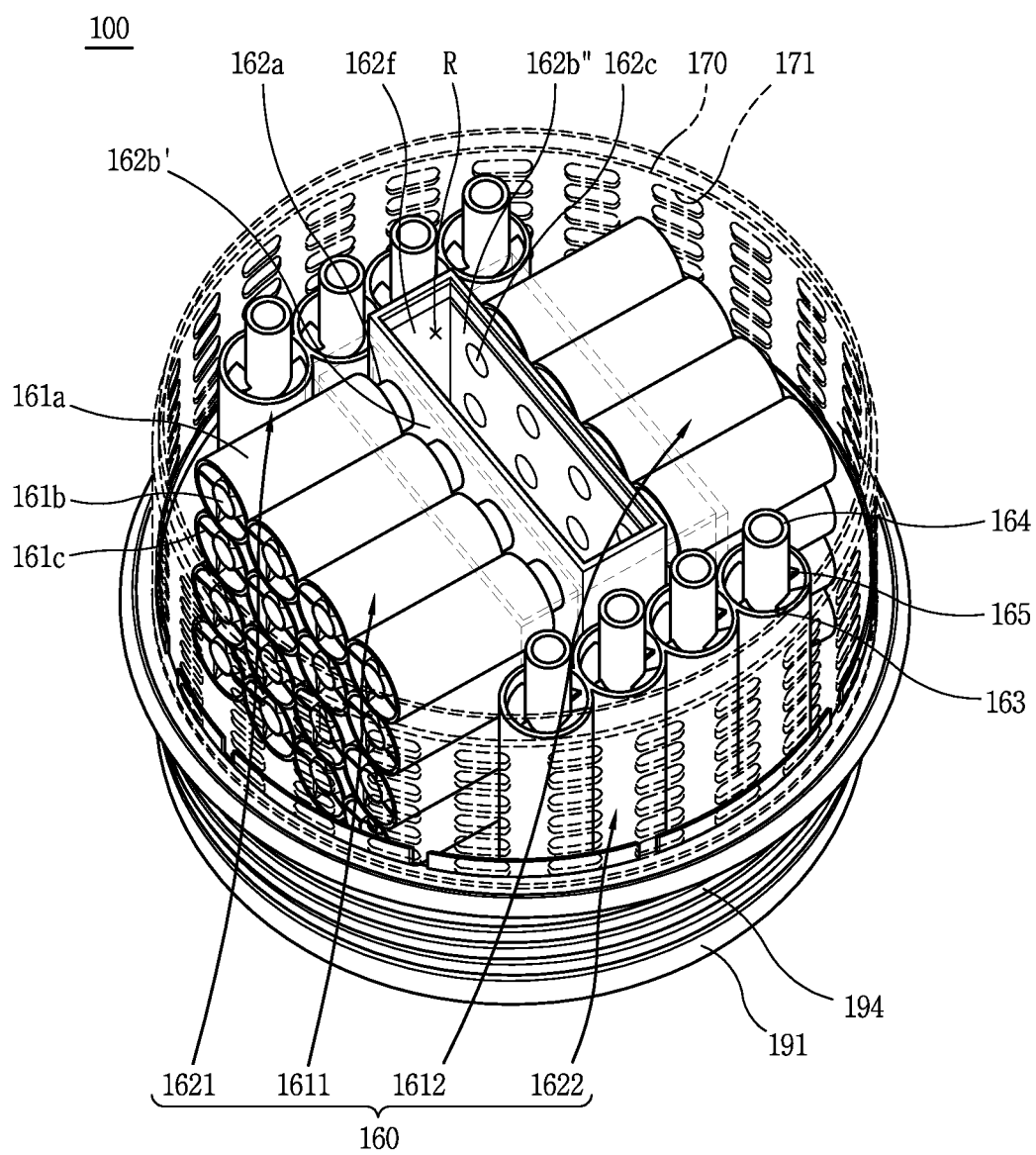
FIG. 5 is a perspective view illustrating an internal structure of the dust collector illustrated in FIG. 2.

Hereinafter, the internal structure of a dust collector 100 including the axial inlet type cyclones 160a will be described. FIG. 5 is a perspective view illustrating an internal structure of the dust collector 100 illustrated in FIG. 2.

The secondary cyclone unit 160 is formed of a set of the axial inlet type cyclones 1611, 1612, 1621, 1622. The axial inlet type cyclones 1611, 1612, 1621, 1622 are supplied with air and fine dust along the axial direction, and formed to generate a swirling flow to separate the fine dust from the air. The axial inlet type cyclones 1611, 1612, 1621, 1622 included in the secondary cyclone unit 160 may be divided into a first group 1 (or first axial inlet type cyclones) 611, 1612 and a second group (or second axial inlet type cyclones) 1621, 1622 according to the type and arrangement thereof.

The first group 1611, 1612 is configured with cyclones classified as a forward, axial inlet, tube type described in FIG. 4. In contrast, the second group 1621, 1622 is configured with cyclones classified as a backward, axial inlet, tube type. However, the second group 1621, 1622 may also be configured with cone type cyclones other than tube type cyclones. Hereinafter, the detailed configurations of the first group 1611, 1612 and the second group 1621, 1622 will be sequentially described.

The axial inlet type cyclones of the first group 1611, 1612 are arranged in such a manner that the inlet (I) (see FIG. 8) faces the mesh 170. Since the mesh 170 surrounds the secondary cyclone unit 160 in a lateral direction, the axial inlet type cyclones of the first group 1611, 1612 have a horizontally arranged arrangement. The air that has passed through the primary cyclone unit 150 flows into the secondary cyclone unit 160 through the mesh 170. The inlet (I) of the axial inlet type cyclones belonging to the first group 1611, 1612 is open toward the mesh 170, and thus the air that has passed through the hole 171 of the mesh 170 may be supplied as it is with no change in the flow direction. Since a change in the flow direction causes pressure loss, the arrangement of the axial inlet type cyclones belonging to the first group 1611, 1612 may suppress the pressure loss.

The axial inlet type cyclones of the first group 1611, 1612 have a structure stacked in multiple stages (or rows). FIG. 5 illustrates a structure in which axial inlet type cyclones are stacked in four stages. A number of stages may be determined according to a height of the dust collector 100.

As more cyclones are provided in a limited space, the separation performance of the dust collector 100 is improved. Accordingly, when the axial inlet type cyclones arranged in a horizontal direction are stacked in multiple layers, the separation performance of the secondary cyclone unit 160 may be expected to be improved through an increase of the number of the axial inlet type cyclones.

The axial inlet type cyclones of the first group 1611, 1612 have a tube type structure. Therefore, an inner diameter of the body 161a is constant. Referring to FIG. 5, it can be seen that an inlet-side inner diameter and an outlet-side inner diameter of the body 161a are constant.

The air outlet (O1) (see FIG. 8) and the fine dust outlet (O2) (see FIG. 8) of the axial inlet type cyclones belonging to the first group 1611,1612 are open toward the same direction. Furthermore, the inlet (I) of the axial inlet type cyclones belonging to the first group 1611, 1612 is open toward a direction opposite to the air outlet (O1) and the fine dust outlet (O2). It is because the first group 1611, 1612 is composed of cyclones classified into a forward, axial inlet, tube type.

The cone type body has a smaller outlet-side inner diameter than an inlet-side inner diameter. On the other hand, the tube type body 161a has an outlet-side inner diameter same as an inlet-side inner diameter. Accordingly, both the air outlet and the fine dust outlet may be formed at an outlet side of the tube type body 161a, and thus, there is an advantage in that it can be easily formed as a forward cyclone. On the other hand, a cone type body may typically be configured with a backward cyclone, but it is not suitable that the cone type body is formed with a forward cyclone.

The axial inlet type cyclones of the first group 1611, 1612 are configured with a tube type, and thus it is suitable that these axial inlet type cyclones are formed with forward cyclones. Furthermore, since the first group 1611, 1612 is configured with forward axial inlet type cyclones, improvement of the separation performance of the dust collector 100 may be expected through suppressing a change in the flow direction of air.

Next, the axial inlet type cyclones of the second group 1621, 1622 will be described. A number of cyclones and an axial length of each cyclone have an effect on the separation performance. In order to improve the separation performance of the cyclone, it is preferable that a number of cyclones increases, and an axial length of each cyclone increases. However, a space within the housing 110 is restrictive. Therefore, the number of cyclones and the axial length of each cyclone cannot be infinitely increased.

The bodies 161*a* forming all the axial inlet type cyclones of the first group 1611, 1612 have the same axial length. On the other hand, since the housing 110 has a cylindrical shape, on one side and the other side of the axial inlet type cyclones belonging to the first group 1611, 1612, an axial inlet type cyclone having the same axial length as that of the remaining ones cannot be arranged in a horizontal direction. It is because a space in which the axial inlet type cyclones placed in a horizontal direction cannot be secured due to the shape of the housing 110.

If this space is discarded, a dead zone occurs within the housing 110. The dead zone denotes a wasted space that does not contribute to improving the separation performance of the secondary cyclone unit 160 through an increase in the number of cyclones or the axial length of each cyclone.

The axial inlet type cyclones of the second group 1621, 1622 are arranged such that the inlet and the outlet face the height direction of the dust collector 100. The axial inlet type cyclones of the second group 1621, 1622 have an arrangement erected in a vertical direction. An area in a horizontal direction occupied by one of the axial inlet type cyclones belonging to the second group 1621, 1622 is smaller than that occupied by one of the axial inlet type cyclones belonging to the first group 1611, 1612.

Accordingly, the axial inlet type cyclones belonging to the second group 1621, 1622 may be provided on one side and the other side of the first group 1611, 1612, respectively. Referring to FIG. 5, it can be seen that the axial inlet type cyclones belonging to the second group 1621, 1622 are arranged by four along a direction parallel to an axial direction of the axial inlet type cyclones belonging to the first group 1611, 1612.

When the axial inlet type cyclones of the second group 1621, 1622 are arranged in a vertical direction on one side and the other side of the first group 1611, 1612, the generation of dead zone may be suppressed to the utmost. When the generation of dead zone is suppressed, improvement in the separation performance of the secondary cyclone unit 160 may be expected.

The air outlet (O1) (see FIG. 7) and the fine dust outlet (O2) (see FIG. 7) of the axial inlet type cyclones belonging to the second group 1621,1622 are open toward different directions. Furthermore, the inlet (I) (see FIG. 7) of the axial inlet type cyclones belonging to the second group 1621, 1622 are open toward the same direction as the air outlet and open toward a direction opposite to the fine dust outlet.

Specifically, the inlet (I) and the air outlet (O1) of the axial inlet type cyclones belonging to the second group 1621, 1622 are open toward an upper side of the dust collector 100. On the contrary, the fine dust outlets of the cyclones belonging to the second group 1621, 1622 are open toward a lower side of the dust collector 100.

Accordingly, air introduced through the inlets of the axial inlet type cyclones belonging to the second group 1621, 1622 reverses the flow direction and is discharged again toward an upper side of the dust collector 100. As a result, the axial inlet type cyclones belonging to the second group 1621, 1622 are classified into a backward structure.

The axial inlet type cyclones of the second group 1621, 1622 respectively include a casing 163, a vortex finder 164 and a vane 165. The casing 163 corresponds to a body 161*a* of the axial inlet type cyclones belonging to the first group 1611, 1612. The body 161*a* and the casing 163 have substantially the same configuration except for the structural difference.

The vortex finder 164 and the vane 165 of the axial inlet type cyclones belonging to the second group 1621, 1622 have a configuration corresponding to the vortex finder 161*b* and the vane 161*c* of the axial inlet type cyclones belonging to the first group 1611, 1612. Therefore, these descriptions will be substituted by earlier description thereof.

Hereinafter, a rising flow path (R) of air for discharging air discharged from the axial inlet type cyclones belonging to the first group 1611, 1612 to an outside of the dust collector 100 will be described. As illustrated in FIG. 2, the outlet 123 of the dust collector 100 may be formed at an upper portion of the dust collector 100. The axial inlet type cyclones of the second group 1621, 1622 does not require an additional structure for guiding air discharged from the air outlet (O1) to the exhaust guide 124 or the outlet 123 of the dust collector 100. It is because the axial inlet type cyclones of the second group 1621, 1622 have the air outlet (O1) directed to an upper side of the dust collector 100.

On the contrary, since the axial inlet type cyclones belonging to the first group 1611, 1612 are placed in a horizontal direction, an additional flow path is required to discharge air to the outlet formed at an upper portion of the dust collector 100. In this specification, the flow path is referred to as a rising flow path (R) based on the meaning of raising and discharging the air discharged in a horizontal direction to the outlet.

The axial inlet type cyclones of the first group 1611, 1612 are divided into a first column 1611 and a second column 1612 based on the rising flow path (R). The axial inlet type cyclones provided on one side of the rising flow path (R) correspond to the first column 1611, and the axial inlet type cyclones provided on the other side of the rising flow path (R) correspond to the second column 1612. The first column 1611 of the axial inlet type cyclones and the second column 1612 of the axial inlet type cyclones are arranged toward directions opposite to each other.

The rising flow path (R) is provided between the first row 1611 and the second row 1612. The air discharged from the axial inlet type cyclones provided in the first column 1611 and the air discharged from the axial inlet type cyclones provided in the second column 1612 are both discharged to the rising flow path (R). Then, the air rises toward the outlet of the dust collector 100 from the rising flow path (R).

The dust collector 100 includes an outlet base 162*b*', 162*b*" and a sidewall 162*f* to form a rising flow path (R). The outlet base 162*b*', 162*b*" has a curved surface or a flat surface. The outlet base 162*b*', 162" corresponds to a lateral surface of a cylindrical or polygonal pillar. Referring to FIG. 5, it is shown a configuration in which the outlet base 162*b*', 162" corresponds to a lateral surface of a rectangular pillar.

The outlet bases 162*b*', 162*b*" are provided with the same number as that of the columns of the first group 1611, 1612. For example, FIG. 5 illustrates a configuration in which two outlet bases 162*b*', 162*b*" are provided to correspond to the first column 1611 and the second column 1612 of the first group 1611, 1612. The two outlet bases 162b', 162b" are arranged to face each other at positions spaced apart to form a rising flow path (R).

Hereinafter, for the sake of convenience of explanation, an outlet base provided on the first column 1611 side of the two outlet bases 162b', 162b" will be referred to as a first outlet base 162b', and an outlet based provided on the second column 1612 side thereof is referred to as a second outlet base 162b". The first outlet base 162b' and the second outlet base 162b" are arranged to face each other at positions spaced apart from each other.

The sidewalls 162f together with the outlet bases 162b', 162b" form the remaining sides of a polygonal pillar. Two sidewalls 162f are provided in a similar manner to that of the outlet base 162b', 162b". The two sidewalls 162f are arranged to face each other at positions spaced apart from each other. Referring to FIG. 5, it is shown a configuration in which the sides of a rectangular pillar are formed by the two sidewalls 162f and the two outlet bases 162b', 162b".

In a region surrounded by the two outlet bases 162b', 162" and the two sidewalls 162f, a rising flow path (R) of air discharged from the axial inlet type cyclones of the first group 1611, 1612 is formed. The air discharged from the axial inlet type cyclones of the first group 1611,1612 is collected into the rising flow path (R) between the first column 1611 and the second column 1612. The rising flow path (R) leads to an outlet 123 of the dust collector 100 formed on an upper side of the housing 110. Therefore, the air is moved upward by a suction force of the suction motor, and discharged to the outlet 123 of the dust collector 100 along the exhaust guide 124.

The air outlet holes 162c are formed on each outlet base 162b', 162b". The air vent holes 162c are formed in the same number as that of the axial inlet type cyclones of the first group 1611, 1612. In addition, the air vent holes 162c have the same arrangement as that of the bodies 161a of the axial inlet type cyclones belonging to the first group 1611, 1612. For example, the air vent holes 162c may be stacked in multiple stages, and a plurality of air vent holes 162c may be formed in each stage.

The outlet partition portion 162a protrudes from the circumference of each air vent hole 162c toward an inside of the body 161a. Since the air vent hole 162c is formed in the outlet base 162b', 162b, it may be understood that the outlet partition portion 162a protrudes from the outlet base 162b', 162b". The outlet compartments 162a have the same arrangement as that of the bodies 161a similarly to the air vent holes 162c.

The axial inlet type cyclones belonging to the first group 1611, 1612 are formed as the outlet partition portions 162a are partially inserted into an outlet side of each body 161a. The axial inlet type cyclones of the first group 1611, 1612 and the axial inlet type cyclones of the second group 1621, 1622 may be supported by the support member 190. The support member 190 may be formed to receive a lower end of the axial inlet type cyclones belonging to the first group 1611, 1612 and to receive an outlet side of the axial inlet type cyclones belonging to the second group 1621, 1622.

The support member 190 includes a receiving portion 191, an inclined portion 192, and a dust collecting guide 193. A sealing member 194 may be coupled to an outer circumferential surface of the support member 190. Each configuration of the support member 190 will be described later with reference to FIG. 6.

Figure 6:
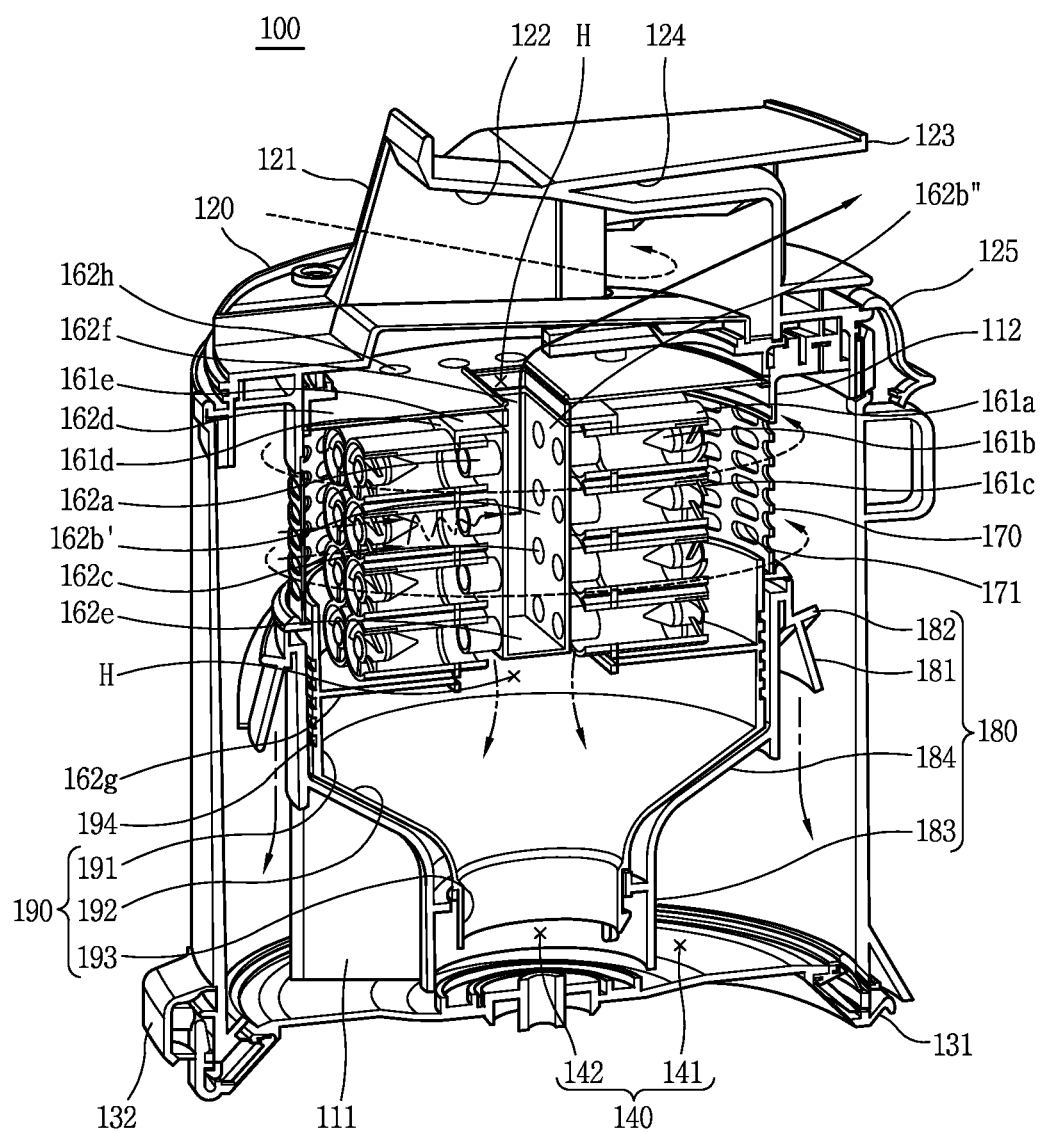
FIG. 6 is a cross-sectional view in which the dust collector illustrated in FIG. 2 is cut along line A-A and seen from one side.
Figure 7:
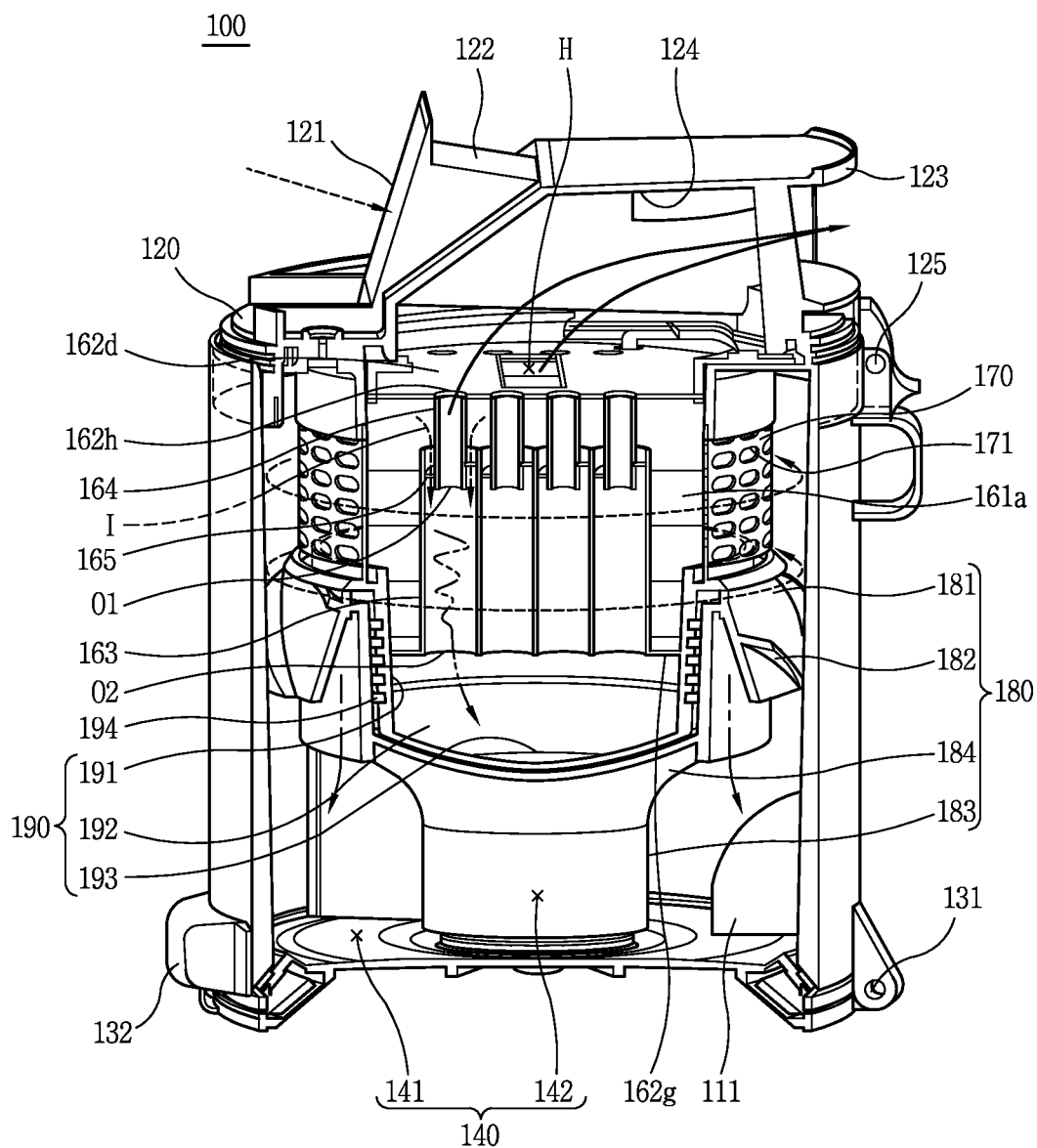
FIG. 7 is a cross-sectional view in which the dust collector illustrated in FIG. 2 is cut along line B-B and seen from one side.

FIG. 6 is a cross-sectional view in which the dust collector 100 illustrated in FIG. 2 is cut along line A-A and seen from one side, and FIG. 7 is a cross-sectional view in which the dust collector 100 illustrated in FIG. 2 is cut along line B-B and seen from one side. Referring to FIG. 6, a lower block portion (or lower block surface) 162e is formed at a lower end of the first outlet base 162b', the second outlet base 162b" and the two sidewalls 162f. When the outlet base 162b', 162b" and the sidewalls 162f of the dust collector 100 correspond to a lateral surface of a cylindrical or polygonal pillar, the lower block portion 162e corresponds to a bottom side of the cylindrical or polygonal pillar. An upper surface of the cylindrical or polygonal pillar is open to discharge air through the rising flow path (R).

The lower block portion 162e partitions the rising flow path (R) and the second dust collection unit 142 to block a suction force generated by the suction motor from reaching fine dust collected in the second dust collection unit 142. Accordingly, the lower block portion 162e prevents the fine dust collected in the second dust collection portion 142 from being scattered to the rising flow path (R) of the air.

If there is no lower block portion 162e, fine dust discharged from the fine dust outlet (O2) of the axial inlet type swirl tubes 1612 is moved upward along the rising flow path (R) without being collected by the second dust collection unit 142 to be mixed with the air again. It is because a hole (H) for falling fine dust discharged from the fine dust outlet (O2) of the primary cyclone part 150 is formed directly below the lower block portion 162e.

A mesh 170 is provided in an inner region of the housing 110. The mesh 170 surrounds an outer side of the secondary cyclone unit 160 to form a boundary between the primary cyclone unit 150 and the secondary cyclone unit 160. The axial inlet type cyclones of the secondary cyclone unit 160 are provided in an inner region of the mesh 170. Furthermore, the rising flow path (R) of air is formed in a region surrounded by the first group 1611, 1612 and the second group 1621, 1622.

In order to support the mesh 170, the dust collector 100 may further include a mesh support portion (or mesh support surface) 112. The mesh support portion 112 has a circumference corresponding to a circumference of the mesh 170, and is formed to surround an upper rim of the mesh 170. The mesh support portion 112 may be formed integrally with the housing 110, but is not necessarily limited thereto.

The upper block portion (or upper block surface) 162d is formed at an upper end of the first outlet base 162b', the second outlet base 162b" and the two sidewalls 162f. The upper block portion 162d extends in a circumferential direction toward the support portion of the mesh 170 around the rising flow path (R). The upper block portion 162d has a circular outer rim to be brought into close contact with an inner circumferential surface of the support portion of the mesh 170.

The upper block portion 162d may partition an inlet of the secondary cyclone unit 160 and a downstream side of the rising flow path (R) to prevent the mixing of air flowing into the secondary cyclone unit 160 and air discharged through the rising flow path (R). Since the fine dust outlet (O2) of the axial inlet type cyclones belonging to the first group 1611, 1612 is formed around the air outlet (O1), fine dust is discharged through the circumference of the air outlet (O1). However, a remaining region excluding the fine dust falling flow paths (D1, D2) which will be described later may be blocked by the outlet base 162b', 162b" and the upper block portion 162d, thereby preventing the mixing of the inflow air and the exhaust air.

A pre-filter (not shown) may be provided on the upper block portion 162d. The pre-filter may be formed to filter ultra-fine dust from the air discharged through the rising flow path (R). The pre-filter is referred to as a pre-filter because it is provided at an upstream side of the suction motor on the basis of the flow of air.

The body base 161*d* is formed to support the bodies 161*a* of the axial inlet type cyclones belonging to the first group 1611, 1612. The body base 161*d* is formed on a curved surface or a flat surface, and the bodies 161*a* protrude to both sides of the body base 161*d*. An inlet side toward the mesh 170 and an outlet side toward the rising flow path (R) may be distinguished from each other with respect to the body base 161*d*.

The rim portion (or rim surface) 161*e* extends from the body base 161*d* toward the outlet side to surround the outlet side of the body 161*a*. It can be understood that the body base 161*d* corresponds to any one side of a square pillar and the rim portion 161*e* corresponds to any two sides and an upper surface of the rectangular pillar.

The rim portion 161*e* is brought into close contact with the outlet base 162*b'*, 162*b''* to seal the remaining rim except for a lower portion of the outlet base 162*b'*, 162*b''*. The lower portion of the outlet base 162*b* should be open since a falling flow path of fine dust discharged from the axial inlet type swirl tube 1612 should be formed. In such a case, fine dust may fall to the second dust collection unit 142.

On the contrary, the remaining rim except for the lower portion of the outlet base 162*b* should be sealed. If the remaining rim is not sealed, then there is a concern that fine dust discharged from the axial inlet type cyclones 160 of the first group 1611, 1612 may flow into an inlet of the axial inlet type cyclones belonging to the first group again. The rim portion 161*e* performs the role of the sealing.

Referring to FIG. 7, air vent holes 162*h* of the second group 1621, 1622 are formed on one side and the other side of the rising flow path (R), respectively. The air vent holes 162*h* are formed on the upper block portion 162*d*, and formed by a number corresponding to the axial inlet type cyclones belonging to the second group 1621, 1622.

The second dust collecting unit top cover (or second dust collection chamber top cover) 162*g* is provided at a lower side of the secondary cyclone section 160. The second dust collection unit top cover 162*g* may be provided to face the upper block portion 162*d*. The second dust collection unit top cover 162*g* partitions an inlet side of the axial inlet type cyclones and the second dust collection unit 142 to prevent scattering of fine dust collected in the second dust collection unit 142. The second dust collection unit top cover 162*g* may be brought into contact with an inner circumferential surface of the support member 190 along a circumferential direction.

A hole (H) for falling fine dust discharged from the axial inlet type cyclones belonging to the first group 1611, 1612 is formed on the second dust collection unit top cover 162*g*. This hole may be formed directly below the lower blocking portion 162*e*, and may be formed to have a larger area than the lower block portion 162*e*. The fine dust discharged from the axial inlet type cyclones belonging to the first group 1611, 1612 falls to the second dust collection unit 142 through the hole H to be collected.

The vortex finders 164 of the axial inlet type cyclones belonging to the second group 1621, 1622 are protruded from the circumference of the air discharge hole 162*h* formed on the upper block portion 162*d* toward an inner side of the casing 163. Furthermore, the vane 165 is formed between an outer circumferential surface of the vortex finder 164 and an inner circumferential surface of the casing 163, and extended in a spiral direction.

The fine dust outlet (O2) of the axial inlet type cyclones belonging to the second group 1621, 1622 is formed on the second dust collection unit top cover 162*g*. The casing 163 of the axial inlet type cyclones belonging to the second group 1621, 1622 protrudes from a circumference of the fine dust outlet (O2) formed on the second dust collection unit top cover 162*g* toward the upper block portion 162*d*.

The cyclones of the second group 1621, 1622 are supplied with air in an axial direction. An inlet-side inner diameter and an outlet-side inner diameter of the casing 163 are the same. Air introduced into the cyclones of the second group 1621, 1622 is reversed in flow direction and discharged to the air outlet formed in a region surrounded by the inlet. Accordingly, the cyclones of the second group 1621, 1622 are classified as axial inlet type, tube type, backward cyclones.

A stack height of the first group 1611, 1612 stacked in multiple stages may be referred to as H1. Furthermore, a height of the axial inlet type cyclones belonging to the second group 1621, 1622 may be referred to as H2. Here, a height difference between H1 and H2 may be referred to as HD. The height difference (HD) is smaller than an outer diameter (OD) of any one of the axial inlet type cyclones belonging to the first group 1611, 1612. Such a relationship is intended to minimize the occurrence of dead zone.

If the height difference (HD) is greater than the outer diameter (OD) of any one of the axial inlet type cyclones belonging to the first group 1611, 1612, then it denotes that there is a dead zone in a height direction of the dust collector 100. Furthermore, this means that one stage of the first group 1611, 1612 stacked in multiple stages is further increased or decreased to reduce the height difference (HD) to be smaller than the outer diameter (OD). Therefore, when the height difference (HD) is made smaller than the outer diameter (OD), the occurrence of dead zone in a height direction may be suppressed, thereby contributing to the improvement of the separation performance of the secondary cyclone unit 160.

Hereinafter, the process of separating air and foreign matter will be described with reference to FIGS. 6 and 7. The air and the foreign matter are sequentially passed through the suction nozzle 20 and the connecting unit 30 by a suction force generated by the suction motor of the vacuum cleaner 1, and introduced into the dust collector 100 through the inlet of the dust collector 100.

The air introduced into the dust collector 100 swirls inside the housing 110. A centrifugal force of dust that is heavier than air is larger than that of the air. Accordingly, dust swirls along an inner circumferential surface of the housing 110 and then falls to be collected in the first dust collection unit 141.

The air passes through the hole 171 of the mesh 170 and flows into the secondary cyclone unit 160. The inlets (I) of the axial inlet type cyclones belonging to the first group 1611, 1612 are arranged to face the mesh 170, and thus the air that has passed through the hole 171 of the mesh 170 in a horizontal direction flows into the axial inlet type cyclones of the first group 1611, 1612 as it is with no change in the flow direction.

In contrast, since the inlets (I) of the axial inlet type cyclones belonging to the second group 1621, 1622 are arranged to face an upper side of the dust collector 100, the air that has passed through the mesh 170 changes the flow direction to a vertical direction to flow into the axial inlet type cyclones of the second group 1621, 1622.

The air and fine dust introduced into the axial inlet type cyclones of the first group 1611, 1612 swirl about a horizontal axis by the vane 161*c*. The air introduced into the axial inlet type cyclones of the second group 1621, 1622 swirls about a vertical axis by the vane 165. A centrifugal force of fine dust that is heavier than air is larger than that of the air. Therefore, air and fine dust are separated from each other by a difference of centrifugal force.

The air discharged from the axial inlet type cyclones of the first group 1611, 1612 sequentially passes through the rising flow path (R) and the exhaust guide 124 and is discharged to the outlet of the dust collector 100. The fine dust discharged from the axial inlet type cyclones of the first group 1611, 1612 passes through the hole of the second dust collection unit top cover 162*g* to be collected by the second dust collection unit 142.

The air discharged from the axial inlet type cyclones of the second group 1621, 1622 passes through the air discharge hole 162*h* of the upper block portion 162*d*, and is discharged to the outlet 123 of the dust collector 100 through the exhaust guide 124 The fine dust discharged from the axial inlet type cyclones of the second group 1621, 1622 is collected in the second dust collection unit 142 through the fine dust outlet (O2) of the second dust collection unit top cover 162*g*.

Referring to FIGS. 6 and 7, the support member 190 includes a receiving portion 191, an inclined portion 192, and a dust collecting guide 193. The receiving portion 191 corresponds to an uppermost portion of the support member 190 and the dust collecting guide 193 corresponds to the lowermost portion of the support member 190. The inclined portion 192 is formed between the receiving portion 191 and the dust collecting guide 193. The receiving portion 191 and the dust collecting guide 193 are formed in a cylindrical shape, and the receiving portion 191 has a larger cross-sectional area than the dust collecting guide 193.

The receiving portion 191 is formed so as to surround a lower stage of the axial inlet type cyclones of the first group 1611, 1612. However, an inner circumferential surface of the receiving portion 191 should be spaced from the inlet (I) of the axial inlet type cyclones belonging to the first group 1611, 1612 so as not to block the flow path of air and fine dust flowing into the lower stage.

The inclined portion 192 is formed in an inclined manner such that the cross-sectional area gradually decreases toward the bottom of the support member 190. Accordingly, the fine dust discharged from the axial inlet type cyclones flows down smoothly along the inclined portion 192.

The dust collecting guide 193 protrudes from the inclined portion 192 toward the lower cover 130, and is inserted into the dust collection unit boundary 183. Accordingly, the fine dust discharged from the axial inlet type cyclones is guided to the second dust collection unit 142 by the dust collecting guide 193.

The mesh 170 may be mounted at an upper end of the inner housing 180. The inner housing 180 is formed to surround the support member 190. The foregoing skirt 181 is formed at an upper portion of the inner housing 180. Furthermore, the dust collecting boundary 183 is formed at a lower portion of the inner housing 180. The dust collection unit boundary 183 is brought into close contact with the lower cover 130 to partition the dust collection unit 140 into a first dust collection unit 141 and a second dust collection unit 142. A mounting portion 184 for mounting the support member 190 is formed between the skirt 181 and the dust collection unit boundary 183. The mounting portion 184 may be formed to be inclined in the same manner as the inclined portion 192 of the support member 190.

A ring-shaped sealing member 194 may be provided between an inner circumferential surface of the inner housing 180 and an outer circumferential surface of the support member 190. A plurality of sealing members 194 may be provided. When the support member 190 is inserted into the inner housing 180, the sealing member 194 seals between the inner housing 180 and the support member 190. Accordingly, it may be possible to prevent the leakage of fine dust collected in the second dust collection unit 142.

Figure 8:
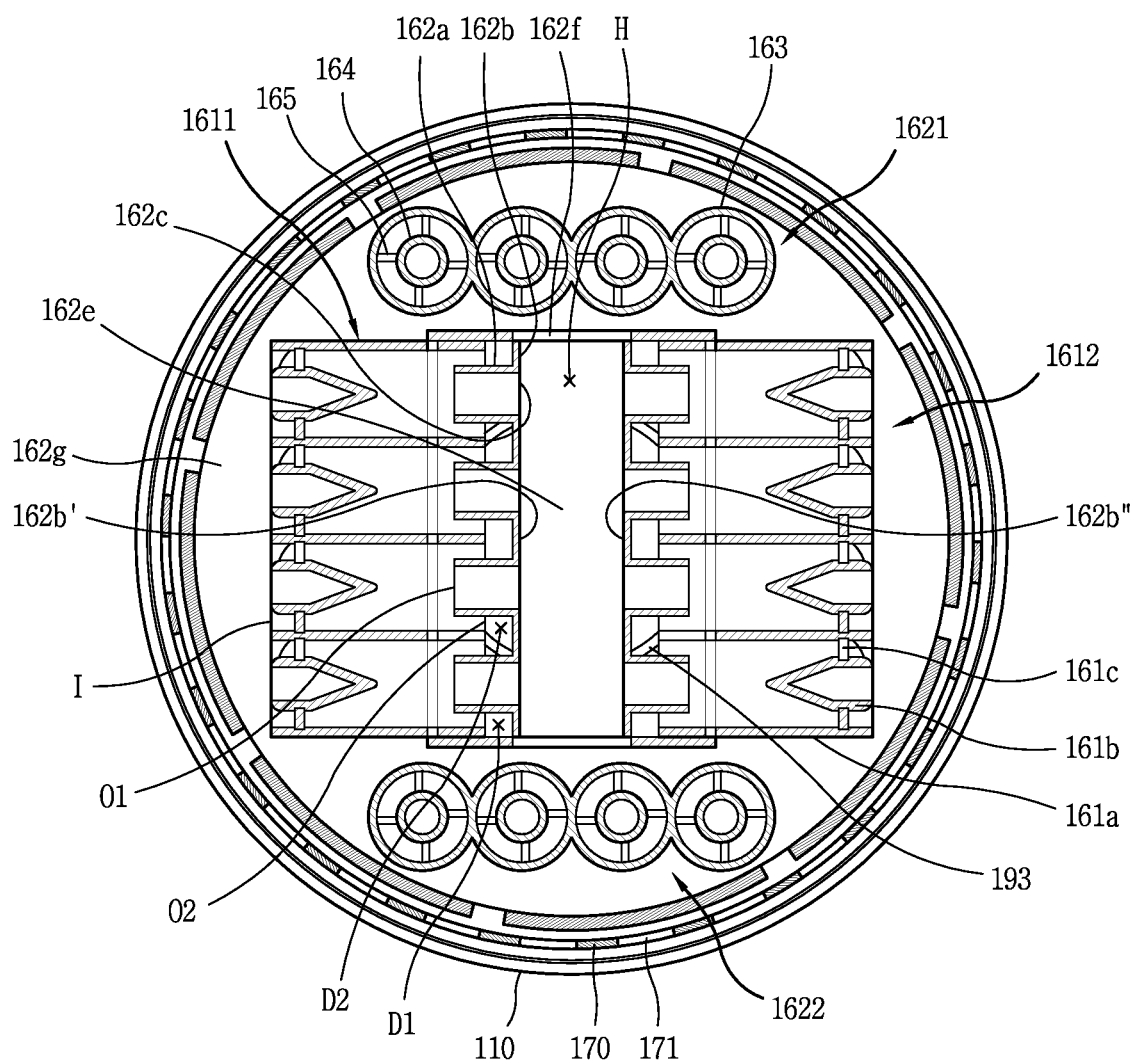
FIG. 8 is a cross-sectional view in which the dust collector illustrated in FIG. 2 is cut along line C-C and seen from the top.

FIG. 8 is a cross-sectional view in which the dust collector 100 illustrated in FIG. 2 is cut along line C-C and seen from the top. A mesh 170 is provided in an inner region of the housing 110. The primary cyclone unit 150 is formed between an inner circumferential surface of the housing 110 and an outer circumferential surface of the mesh 170. The secondary cyclone unit 160 is provided in an inner region of the mesh 170.

The secondary cyclone unit 160 includes the axial inlet type cyclones of the first group 1611, 1612 placed to face a horizontal direction and the axial inlet type cyclones of the second group 1621, 1622 erected to face a vertical direction.

The axial inlet type cyclones of the first group 1611, 1612 are stacked in multiple stages. The axial inlet type cyclones of the first group 1611, 1612 include a first column 1611 arranged on one side of the rising flow path (R) and a second column 1612 arranged on the other side of the rising flow path (R). The inlet of the axial flow cyclones belonging to the first column 1611 and the inlet of the axial flow cyclones belonging to the second column 1612 are arranged in opposite directions to each other. The outlet of the axial flow cyclones belonging to the first column 1611 and the outlet of the axial flow cyclones belonging to the second column 1612 are arranged to face the rising flow path (R).

The axial inlet type cyclones of the second group 1621, 1622 are provided on one side and the other side of the axial inlet type cyclones belonging to the first group 1611, 1612, respectively. The axial inlet type cyclones belonging to the second group 1621, 1622 reduces a dead zone, thereby contributing to the improvement of the separation performance of the secondary cyclone unit 160 *b*.

The upward flow path (R) is formed in a region surrounded by the first group 1611, 1612 and the second group 1621, 1622. An end portion of the outlet side 161*a*2 of the body 161*a* and the outlet base 162*b*', 162*b*" are spaced from each other to form fine dust falling flow paths (D1, D2) communicating with the second dust collection unit 142 therebetween. Since each stage of the axial inlet type cyclones belonging to the first group 1611, 1612 has the same configuration, the fine dust falling flow paths (D1, D2) extend downward toward the second dust collection unit 142.

The end portions of the outlet sides 161*a*2 of two bodies 161*a* provided adjacent to each other are arranged to be in contact with each other. An end portion of the respective outlet sides 161*a*2 of the two bodies 161*a* in contact with each other and the outlet base 162*b*', 162*b*" are spaced from each other to form fine dust falling flow paths (D1, D2) therebetween. Accordingly, the air outlet (O1) and the fine dust falling flow paths (D1, D2) are alternately formed along the outlet base 162*b*', 162*b*".

As a number of the axial inlet type cyclones increases and a length thereof increases, the separation performance of separating fine dust from air is improved. Furthermore, in order to suppress the flow loss (pressure loss) of air, a flow direction change of the air must be minimized. The pressure loss of the air has an effect on the performance of the dust collector 100.

In the present disclosure, the axial inlet type cyclones of the first group 1611, 1612 and the axial inlet type cyclones of the second group 1621, 1622 constituting the secondary cyclone unit 160 may reduce a region defined by the mesh 170 to the utmost, thereby contributing to the improvement of the separation performance of the dust collector 100. In addition, the axial inlet type cyclones of the first group 1611, 1612 may be stacked in multiple stages to maximize the number of the cyclones within a restricted region, and air inflow and air and fine dust discharge may be carried out with no change in the flow direction to minimize the pressure loss.

Hereinafter, a dust collector applicable to a robot cleaner (or autonomous cleaner) will be described. The dust collector 100 applied to a canister type cleaner and a dust collector 200 applied to a robot cleaner are essentially the same. However, a size of the robot cleaner is smaller than that of the canister type cleaner, and accordingly, the dust collector 200 applied to the robot cleaner must also be smaller. The internal configuration of the dust collector 200 must also be modified to the reduced size. Therefore, the description of the configuration redundant to the embodiment described above will be omitted, and the differences will be described around the differences.

Figure 9:
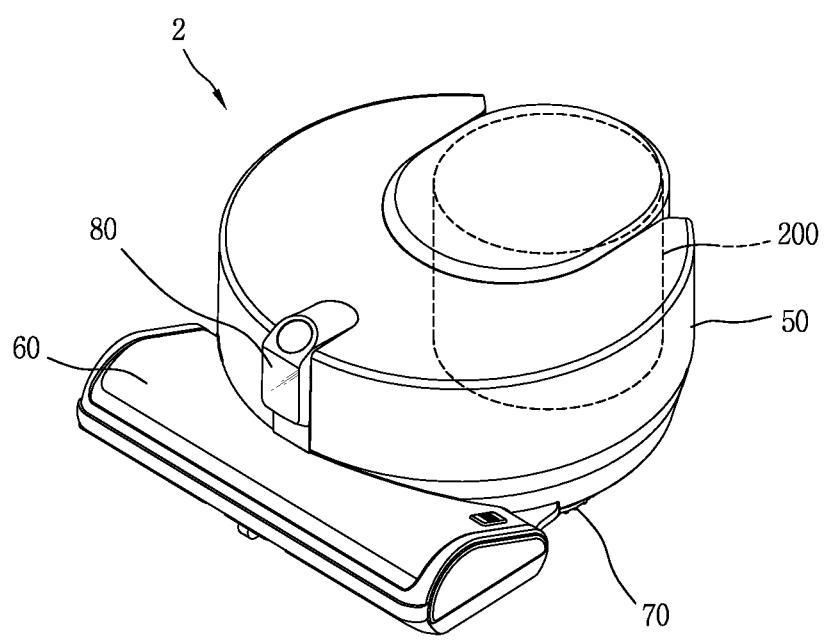
FIG. 9 is a perspective view illustrating an example of a robot cleaner associated with the present disclosure.

FIG. 9 is a perspective view illustrating an example of a robot cleaner 2 associated with the present disclosure. Referring to FIG. 9, the robot cleaner 2 includes a cleaner body 50, a suction nozzle (or suction head) 60, a wheel unit (or driven wheel) 70, a sensor unit (or sensor) 80, and a dust collector 200.

A configuration in which the suction unit built in the cleaner body 50 generates a suction force, a configuration in which the suction nozzle 60 sucks air and foreign matter, and a configuration in which the wheel unit 70 is rotatably coupled to the cleaner body 50 will be substituted by the earlier description.

The sensor unit 80 includes various sensors for autonomous traveling of the robot cleaner. The sensor unit 80 is to implement SLAM (Simultaneous Localization and Mapping) of the robot cleaner. Various location information sensed by the sensor unit 80 is used for autonomous traveling of the robot cleaner.

The dust collector 200 is detachably coupled to the cleaner body 50. The dust collector 200 is configured to separate and collect foreign matter from air sucked through the suction nozzle 60, and discharge the filtered air.

Figure 10:
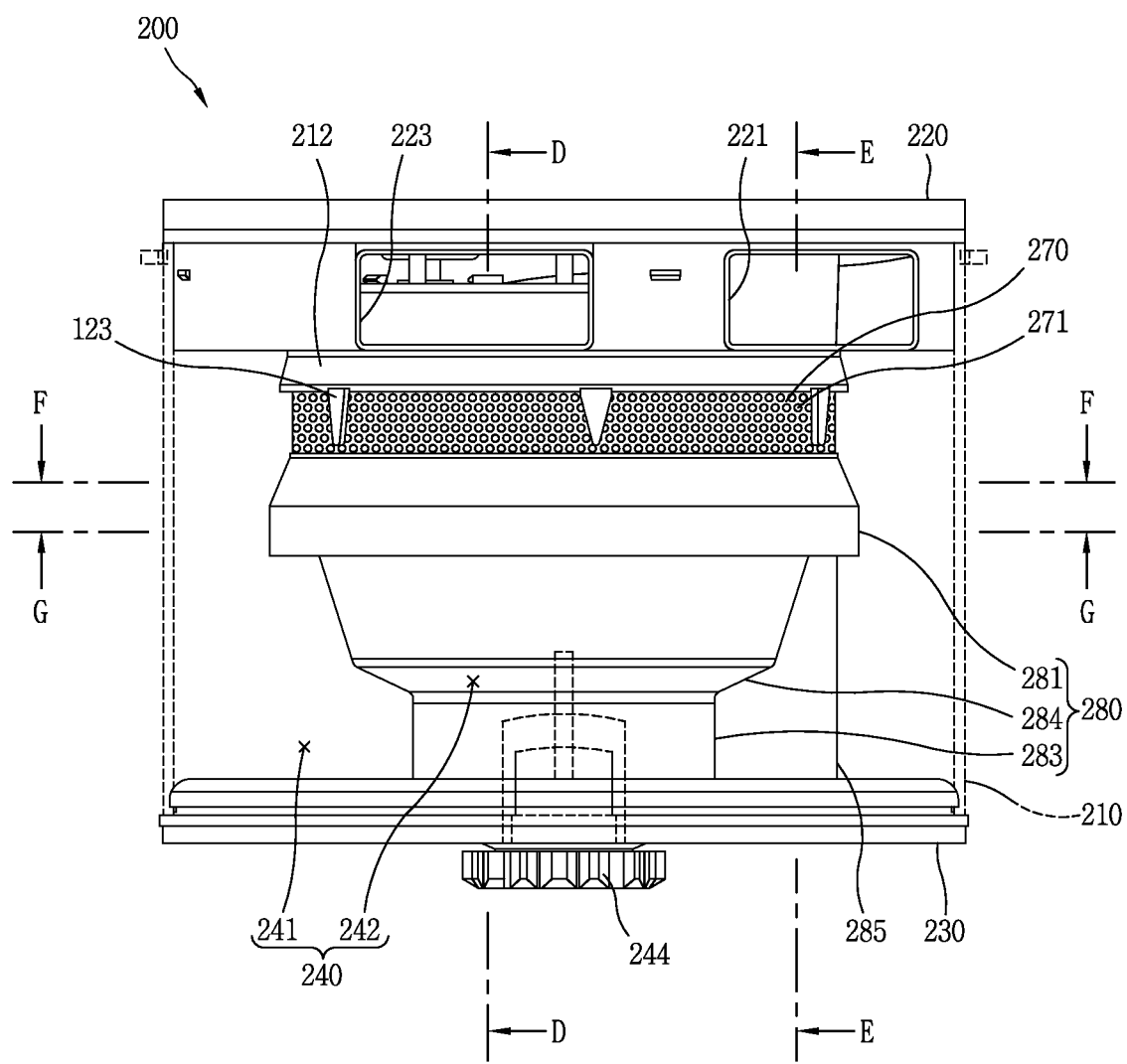
FIG. 10 is a side view of a dust collector coupled to a cleaner body of the robot cleaner.

FIG. 10 is a side view of the dust collector 200 coupled to the cleaner body of the robot cleaner 2. An upper cover 220 is detachably coupled to an upper portion of a cylindrical housing 210. The upper cover 220 is inserted into the housing 210 from an upper side to a lower side of the housing 210 along a height direction of the dust collector 200.

Holes are formed on the housing 210 and the upper cover 220 at positions corresponding to each other. When the housing 210 and the upper cover 220 are coupled to each other at a correct position, the holes of the housing 210 and the holes of the upper cover 220 are provided at positions facing each other. These holes form an inlet 221 and an outlet 223 of the dust collector 200.

A mesh support portion 212 is placed on a mesh 270 in a relatively rotatable manner. The mesh support portion 212 has a circular shape corresponding to the mesh 270. Furthermore, a scraper 213 is formed on the mesh support portion 212.

The scraper 213 protrudes downward from a lower end of the mesh support portion 212. One surface of the scraper 213 is provided to be in contact with an outer circumferential surface of the mesh 270. When the mesh 270 and the mesh support portion 212 rotate relative to each other, the scraper 213 sweeps an outer circumferential surface of the mesh 270. Accordingly, dust adhered to the outer circumferential surface of the mesh 270 may be separated from the mesh 270. The dust separated from the mesh 270 by the scraper 213 falls due to its own weight and is collected in the first dust collection unit 241.

An inner housing 280 may also be installed to be relatively rotatable with respect to the mesh 270. A compression plate 285 may be installed on an outer circumferential surface of the inner housing 280. When the inner housing 280 rotates relative to the mesh 270, the compression plate 285 also rotates to compress dust collected in the first dust collection unit 241. When the dust is compressed, the capacity of the dust collected in the first dust collection unit 241 may be increased.

A gear 244 is rotatably mounted on a lower cover 230. When the dust collector 200 is coupled to the cleaner body 50, the gear 244 is rotatably provided in engagement with a gear of the cleaner body 50. A rotational driving force provided from a motor installed inside the cleaner body 50 may be transmitted to the inner housing 280 and the compression plate 285 of the inner housing 280 through the two gears.

The description of a skirt 281, a seating portion 284, and a dust collection unit boundary 283 of the inner housing 280 will be substituted by the description of the embodiment described above.

Figure 11:
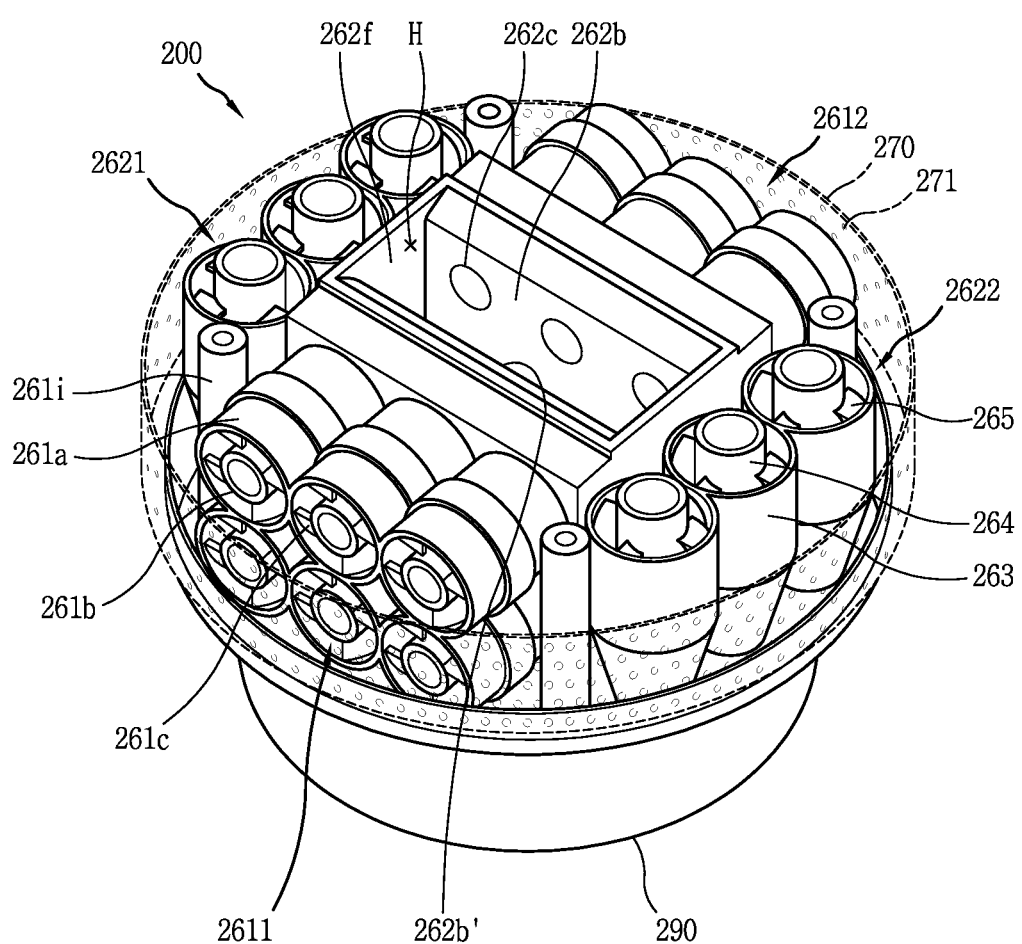
FIG. 11 is a perspective view illustrating an internal structure of the dust collector illustrated in FIG. 10.

FIG. 11 is a perspective view illustrating an internal structure of the dust collector 200 illustrated in FIG. 10. The secondary cyclone unit 260 includes the axial inlet type cyclones of the first group 2611, 2612 and the axial inlet type cyclones of the second group 2621, 2622. The first group 2611, 2621 includes a first column 2611 of axial inlet type cyclones arranged on one side of the rising flow path (R) and a second column 2612 of axial inlet type cyclones arranged on the other side of the rising flow path (R). The first column 2611 of the axial inlet type cyclones and the second column 2612 of the axial inlet type cyclones are arranged toward directions opposite to each other. The first column 2611 of the axial inlet type cyclones and the second column 2612 of the axial inlet type cyclones are stacked in multiple stages.

The axial inlet type cyclones of the first group 2611, 2612 may be stacked in two stages. However, rather than having a special meaning in the number of two stages, the dust collector 200 of the robot cleaner has a meaning that the number of stages of the first group 2611, 2612 is smaller than that of the embodiment described above. For example, a number of stages of the first group 2611, 2612 may be adjusted according to a size of the dust collector 200.

In addition, a number of axial inlet type cyclones arranged in each stage is smaller compared to the embodiment described above. Similarly, the number of the axial inlet type cyclones arranged in each stage may be adjusted according to the size of the dust collector 200.

The axial inlet type cyclones of the second group 2621, 2622 are provided on one side and the other side of the first group 2611, 2612, respectively. The number of the axial inlet type cyclones of the second group 2621, 2622 is smaller compared to the embodiment described above. The number of axial inlet type cyclones belonging to the second group 2621, 2622 may be adjusted according to the size of the dust collector 200.

The axial inlet type cyclones of the second group 2621, 2622 may be formed in a cone type. Referring to FIG. 11, it can be seen that an inner diameter of the casing 263 gradually decreases toward a lower portion of each casing 263. Since the axial inlet type cyclones of the second group 2621, 2622 are backward cyclones, they may be formed in a cone type.

A pillar 261i is to support the secondary cyclone unit 260. The pillar 261i extends along a height direction of the dust collector 200. The structure of the pillar 261i will be described later.

Figure 12:
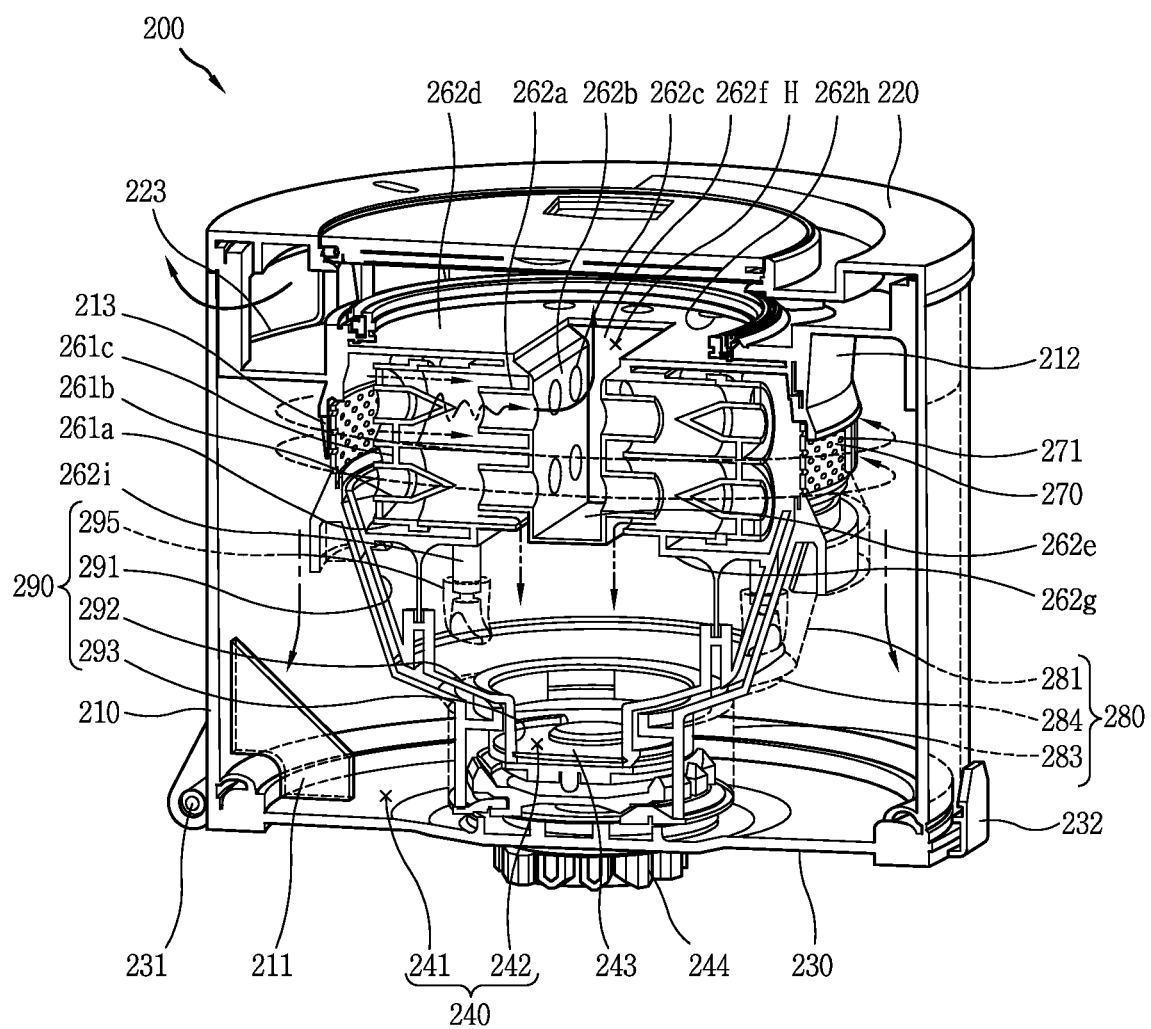
FIG. 12 is a cross-sectional view in which the dust collector illustrated in FIG. 10 is cut along line D-D and seen from one side.
Figure 13:
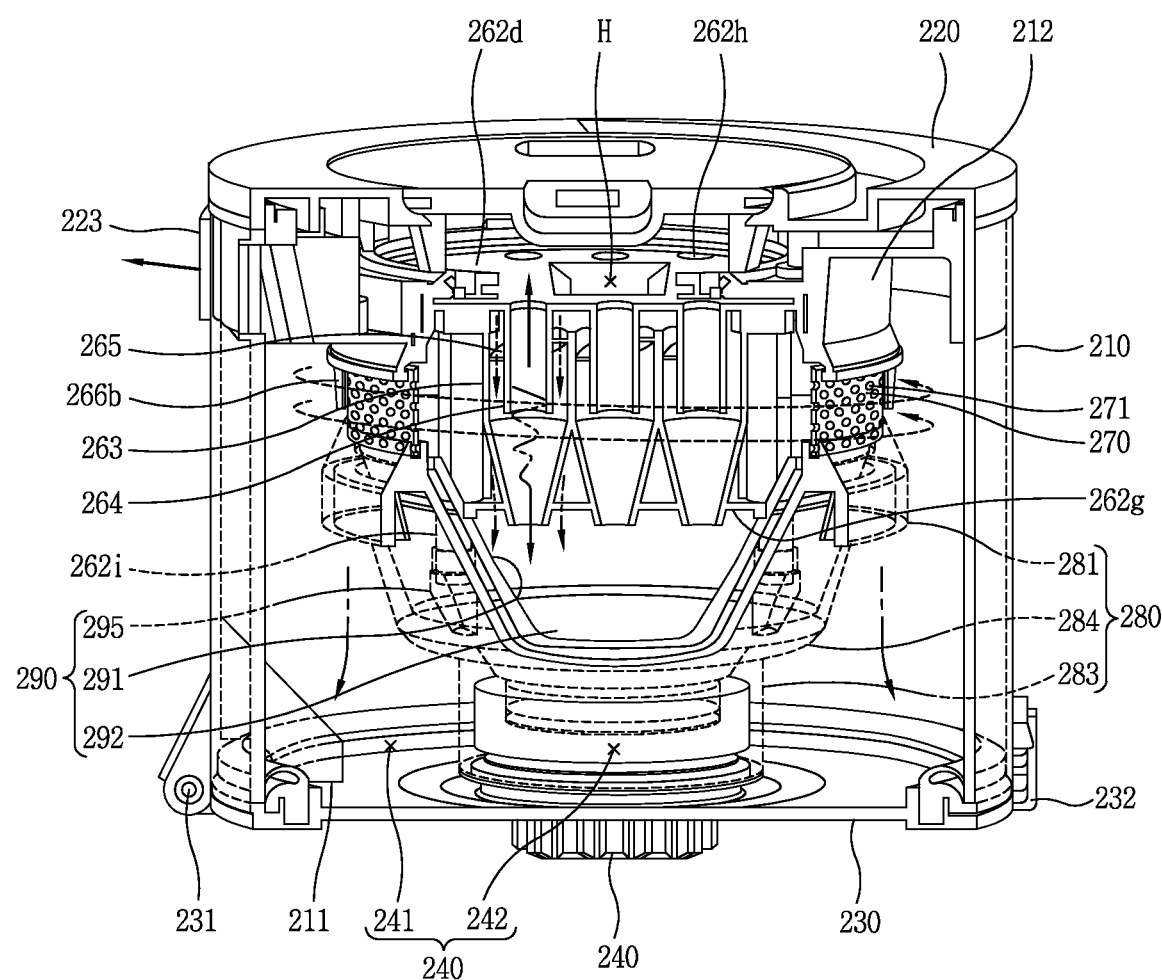
FIG. 13 is a cross-sectional view in which the dust collector illustrated in FIG. 10 is cut along line E-E and seen from one side.
Figure 14:
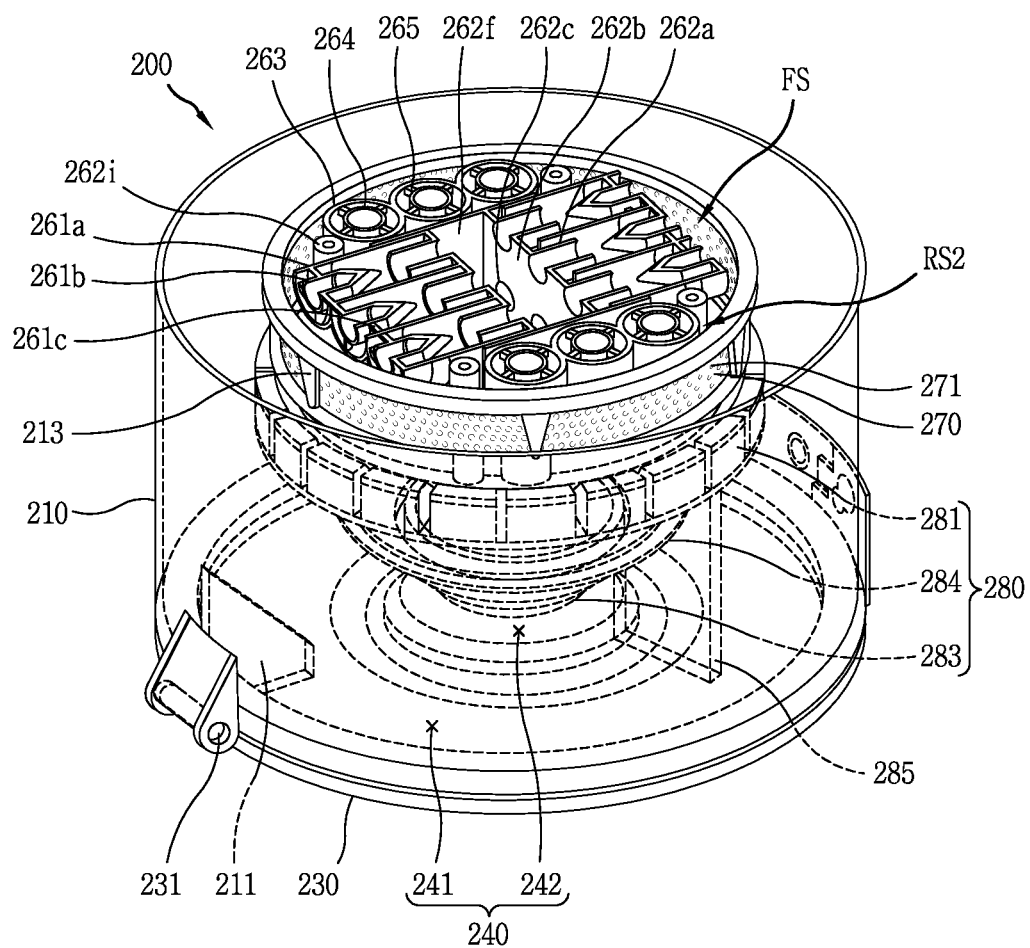
FIG. 14 is a cross-sectional view in which the dust collector illustrated in FIG. 10 is cut along line F-F and seen from one side.
Figure 15:
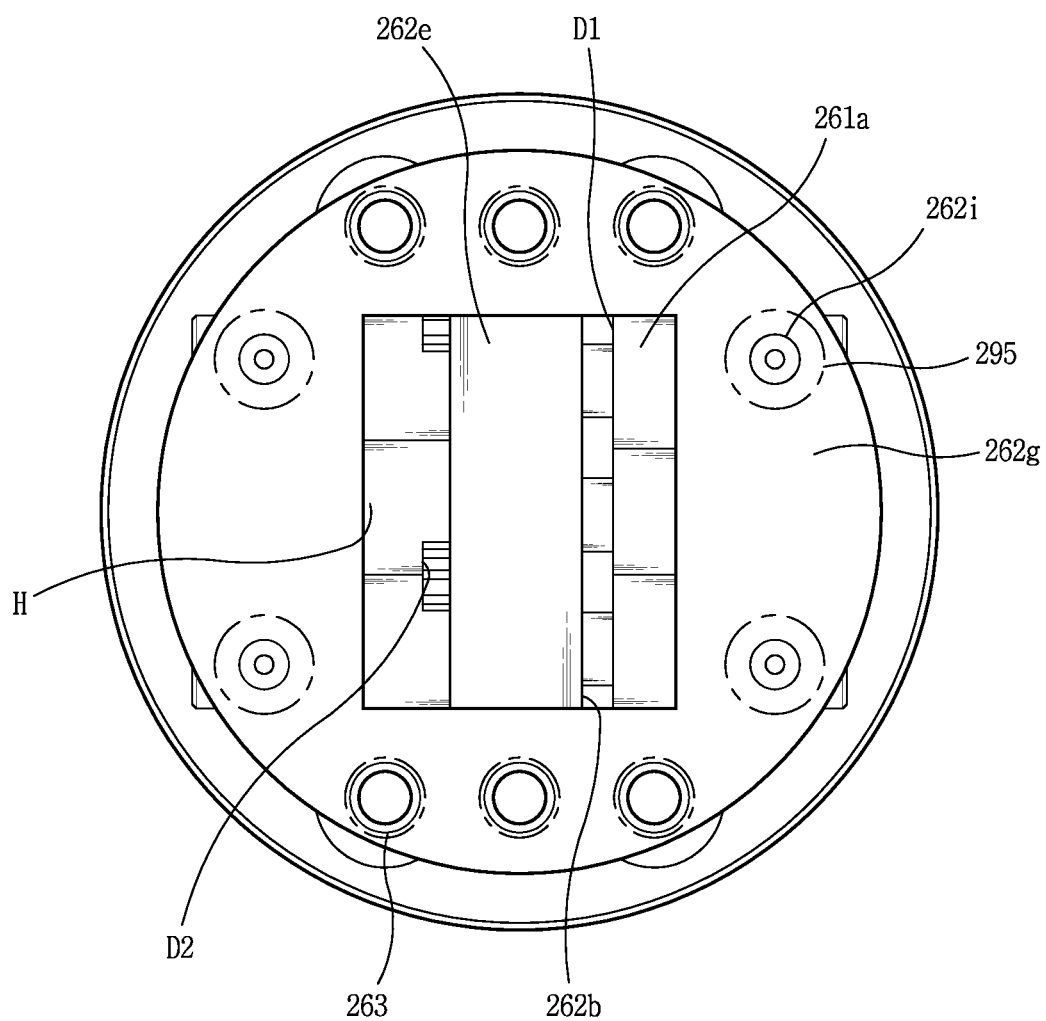
FIG. 15 is a cross-sectional view in which the dust collector illustrated in FIG. 10 is cut along line G-G and seen from one side.

The description of an outlet base 262b', 262b'' and a sidewall 262f forming the rising flow path (R), an air vent holes 262c formed on the outlet bases 262b', 262b'', and a support member 290 will be substituted by the description of the foregoing embodiment. FIG. 12 is a cross-sectional view in which the dust collector 200 illustrated in FIG. 10 is cut along line D-D and seen from one side; FIG. 13 is a cross-sectional view in which the dust collector 200 illustrated in FIG. 10 is cut along line E-E and seen from one side; FIG. 14 is a cross-sectional view in which the dust collector 200 illustrated in FIG. 10 is cut along line F-F and seen from one side; and FIG. 15 is a cross-sectional view in which the dust collector 200 illustrated in FIG. 10 is cut along line G-G and seen from one side.

The support member 290 is formed with a receiving portion 295 for receiving the pillar 261i. The receiving portion 295 is provided at a position corresponding to the pillar 261i. When a member constituting the secondary cyclone unit 260 is inserted into the housing 210 along a direction from an upper side to a lower side of the dust collector 200, the pillar 261i is inserted into the receiving portion 295. The secondary cyclone unit 260 may be supported by a coupling structure of the pillar 261i and the receiving portion 295.

The lower cover 230 may be provided with a lid 243 forming the bottom of the second dust collection unit 242. The lid 243 blocks an open lower portion of the second dust collection unit 242 to prevent dust collected in the second dust collection unit 242 from leaking. When a fastening relation between the lower cover 230 and the housing 210 fastened by a fastening member 232 is released, and the lower cover 230 is rotated about the hinge 231, the lid 243 is released from the second dust collection unit 242. As a result, the second dust collection unit 242 is open, and fine dust collected in the second dust collection unit 242 falls due to its own weight.

The configuration of the secondary cyclone unit 260 is essentially the same as the embodiment described above. However, there is a difference in that the size and number of the axial inlet type cyclones constituting the secondary cyclone unit 260 are changed according to the size of the dust collector 200.

Referring to FIG. 15, a hole (H) for falling fine dust is formed on the second dust collection unit top cover 262g. Furthermore, when the second dust collection unit top cover 262g is seen from the second dust collection unit 242, an outlet side of the axial inlet type cyclones belonging to the first group 2611, 2612 is visually exposed through the hole (H) for falling fine dust.

The body 261a of the axial inlet type cyclones belonging to the first group 2611, 2612 may be in contact with the outlet base 262b or spaced from the outlet base 262b. In FIG. 15, it is illustrated a structure in which the body 261a is in contact with the outlet base 262b on the left side with respect to the lower block portion 262e. Furthermore, on the right side, it is illustrated a structure in which the body 261a is spaced from the outlet base 262b.

When the body 261a is spaced from the outlet base 262b, a fine dust outlet (O2) is naturally formed between the body 261a and the outlet base 262b. However, when the body 261a is spaced from the outlet base 262b, another hole must be additionally formed on an outer circumferential surface of the body 261a to form the fine dust outlet (O2) communicating with the hole (H) for falling fine dust.

The configurations and methods according to the above-described embodiments will not be limited to the foregoing dust collector and cleaner, and all or part of each embodiment may be selectively combined and configured to make various modifications thereto.

According to the present disclosure having the foregoing configuration, a first group of the axial inlet type cyclones have a forward direct inlet structure and a forward direct outlet structure. For example, since the inlet of the axial inlet type cyclones belong to the first group is provided to face the mesh, air passing through the mesh immediately flows into the inlet of the axial inlet type cyclones with no change in the flow direction. Furthermore, since the inlet and the outlet of the axial inlet type swirl tube are formed on opposite sides to each other, air introduced through the inlet is discharged through the outlet with no change in the flow direction.

A change of the flow direction of air does not occur in the course of the air flowing into and out of the axial inlet type cyclones belonging to the first group. Using the structure and arrangement of the axial inlet type cyclones proposed in the present disclosure, the flow loss (pressure loss) of the air may be suppressed, and the performance of the dust collector may be improved.

Furthermore, according to the present disclosure, since the axial inlet type cyclones belonging to the first group are stacked in multiple stages, the number of the axial inlet type cyclones may be increased within a limited space. In particular, the forward, tube, and axial inlet type cyclone is advantageous for miniaturization compared to other types of cyclones. Accordingly, an increase in the number of the multi-stage arrangements of the axial inlet type cyclones improves the separation performance of separating fine dust from air.

In addition, the axial inlet type cyclones belonging to the second group are arranged to face a height direction of the dust collector, and thus they may be arranged in a region where the axial inlet type cyclones belonging to the first group cannot be arranged. Accordingly, the axial inlet type cyclones belonging to the second group may suppress the occurrence of dead space and improve the separation performance of the dust collector.

In addition, according to the present disclosure, the expansion of a space occupied by the axial inlet type cyclones may be suppressed through an optimal arrangement of the axial inlet type cyclones, thereby increasing the capacity of the dust collection unit for collecting dust.

Furthermore, according to the present disclosure, the axial inlet type cyclones belonging to the first group and the cyclones belonging to the second group may be controlled in the arrangement, stack height and number thereof according to the size of the dust collector. Accordingly, the present disclosure provides an arrangement capable of exhibiting an optimal separation performance by the size of the dust collector.

An aspect of the present disclosure provides a cleaner having a structure capable of suppressing the flow loss of air using a high-efficiency forward, tube type, axial inlet type cyclone. Another aspect of the present disclosure provides a structure capable of maximizing an efficiency of the axial inlet type cyclone through an optimal arrangement of the axial inlet type cyclone. In particular, the present disclosure presents a structure of optimizing an arrangement and the like capable of improving the flow direction of air introduced into or discharged from the axial inlet type cyclones, and increasing a number of the axial inlet type cyclones.

In order to accomplish an aspect of the present disclosure, a dust collector according to an embodiment of the present disclosure may include a primary cyclone unit and a secondary cyclone unit, and a set of axial inlet type cyclones constituting the secondary cyclone unit may include a first group stacked in multiple stages, an inlet of which is arranged toward the mesh; and a second group provided on one side and the other side of the first group, respectively, an inlet and an outlet of which are arranged to face a height direction of the dust collector.

The dust collector may include a cylindrical housing configured to form an outer appearance of the dust collector; and a mesh provided at an outer side of the secondary cyclone unit to form a boundary between the primary cyclone unit and the secondary cyclone unit. The primary cyclone unit may be formed inside the housing to cause a swirling flow to separate dust from air introduced into the housing.

The secondary cyclone unit may be formed with a set of axial inlet type cyclones configured to receive air and fine dust that have passed through the cyclone, and cause a swirling flow to separate the fine dust from the air.

The axial inlet type cyclones belonging to the first group may include an air outlet and a fine dust outlet that are open toward the same direction, and the inlet of the axial inlet type cyclones belonging to the first group may be open toward a direction opposite to the air outlet and the fine dust outlet. The fine dust outlet of the axial inlet type cyclones belonging to the first group may be open in a ring shape around the air outlet.

Each of the axial inlet type cyclones belonging to the first group may include a cylindrical body; a vortex finder provided at an inlet side of the body, and provided with a cylindrical first portion and a conical second portion protruded from the first portion toward an outlet side of the body; a vane formed between an outer circumferential surface of the first portion and an inner circumferential surface of the body, and extended in a spiral direction; and an outlet partition portion provided at an outlet side of the body, and formed to partition the air outlet and the fine dust outlet formed around the air outlet.

The dust collector may further include a curved or planar body base; and a curved or planar outlet base, wherein the bodies of the axial inlet type cyclones belonging to the first group are protruded to both sides of the body base, and the outlet base is formed with a number of air vent holes corresponding to the axial inlet type cyclones belonging to the first group, and the outlet partition portion is protruded from a circumference of the air vent hole toward an inside of the body.

The outlet base may include a first outlet base and a second outlet base provided to face each other at positions spaced apart, and the dust collector may further include two sidewalls provided to face each other at positions spaced apart and configured to form the sides of a polygonal pillar along with the first outlet base and the second outlet base, and a rising flow path of air discharged from the axial inlet type cyclones belonging to the first group may be formed in a region surrounded by the first outlet base, the second outlet base, and the two sidewalls, and the rising flow path may communicate with an outlet of the dust collector formed on an upper side of the housing.

The dust collector may further include a first dust collection unit formed in a ring shape inside the housing and formed to collect dust separated from air in the primary cyclone unit; a second dust collection unit formed in a region surrounded by the first dust collection unit, and formed to collect fine dust separated from air in the secondary cyclone unit; and a lower block portion configured to partition the second dust collection unit and the rising flow path to prevent fine dust collected in the second dust collection unit from being scattered to the rising flow path, wherein the lower block portion is formed at a lower end of the first outlet base, the second outlet base, and the two sidewall.

The dust collector may further include a mesh support portion formed to surround an upper rim of the mesh; and an upper block portion formed at an upper end of the first outlet base, the second outlet base, and the two sidewalls, wherein the upper block portion has a circular outer rim to be brought into close contact with an inner circumferential surface of the mesh support portion, and partitions an inlet of the secondary cyclone unit and a downstream side of the rising flow path to prevent the mixing of air introduced into the secondary cyclone unit and air discharged through the rising flow path.

Each of the axial inlet type cyclones belonging to the second group may include a casing; a cylindrical vortex finder provided at an inlet side of the casing; and a vane formed between an outer circumferential surface of the vortex finder and an inner circumferential surface of the casing, and extended in a spiral direction, wherein the upper block portion is formed with a number of air vent holes corresponding to the axial inlet type cyclones belonging to the second group, and the vortex finders of the axial inlet type cyclones belonging to the second group protrude from a circumference of an air vent hole formed on the upper block portion toward an inside of the casing.

The dust collector may further include a first dust collection unit formed in a ring shape inside the housing and formed to collect dust separated from air in the primary cyclone unit; a second dust collection unit formed in a region surrounded by the first dust collection unit, and formed to collect fine dust separated from air in the secondary cyclone unit; and a second dust collection unit top cover provided below the secondary dust cyclone unit to partition an inlet side of the axial inlet type cyclones and the second dust collection unit so as to prevent scattering of fine dust collected in the second dust collection unit, wherein a fine dust outlet of the axial inlet type cyclones belonging to the second group is formed on the second dust collection unit top cover, and the casing is protruded from a circumference of the fine dust outlet formed on the second dust collection unit top cover toward the upper block portion.

The dust collector may further include a first dust collection unit formed in a ring shape inside the housing and formed to collect dust separated from air in the primary cyclone unit; a second dust collection unit formed in a region surrounded by the first dust collection unit, and formed to collect fine dust separated from air in the secondary cyclone unit; and a second dust collection unit top cover provided below the secondary dust cyclone unit to partition an inlet side of the axial inlet type cyclones and the second dust collection unit so as to prevent scattering of fine dust collected in the second dust collection unit, wherein a hole for falling fine dust discharged from the axial inlet type cyclones belonging to the first group is formed on the second dust collection unit top cover.

The mesh may be provided in an inner region of the housing, and the secondary cyclone unit may be provided in an inner region of the mesh, and the rising flow path may be formed in a region surrounded by the first group and the second group.

The body may be divided into an inlet side toward the mesh and an outlet side toward the rising flow path with respect to the body base, and the dust collector may further include a rim portion extended from the body base toward the outlet side direction to surround the outlet side of the body. The rim portion may be brought into close contact with the outlet base to seal a remaining rim except for a lower portion of the outlet base.

The axial inlet type cyclones belonging to the first group may include an air outlet and a fine dust outlet that are open toward different directions, and the inlet of the axial inlet type cyclones belonging to the first group may be open toward the same direction as the air outlet and open toward a direction opposite to the fine dust outlet.

The inlet and the air outlet of the axial inlet type cyclones belonging to the second group may be open toward an upper side of the dust collector, and the fine dust outlet of the axial inlet type cyclones belonging to the first group may be open toward a lower side of the dust collector.

A difference between a stack height of the first group stacked in multiple stages and a height of the axial inlet type cyclones belonging to the second group may be smaller than an outer diameter of the axial inlet type cyclones belonging to the first group.

The dust collector may further include a first dust collection unit formed in a ring shape inside the housing and formed to collect dust separated from air in the primary cyclone unit; and a second dust collection unit formed in a region surrounded by the first dust collection unit, and formed to collect fine dust separated from air in the secondary cyclone unit, wherein an end portion of the outlet side of the body and the outlet base are spaced apart from each other to form a fine dust falling flow path communicating with the second dust collection unit therebetween.

The air outlet and the fine dust falling flow path may be alternately formed along the outlet base. The axial inlet type cyclones belonging to the second group may be arranged along a direction parallel to an axial direction of the axial inlet type cyclones belonging to the first group.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A dust collector, comprising:
a cylindrical housing configured to form an outer appearance of the dust collector;

a cyclone provided inside the housing and configured to form a first swirling flow to separate dust from air introduced into the housing;
axial inlet type cyclones configured to receive air and fine dust that have passed through the cyclone and to form second swirling flows to separate the fine dust from the received air; and
a mesh provided outside the axial inlet type cyclones and configured to form a boundary between the cyclone and the axial inlet type cyclones,
wherein the axial inlet type cyclones include:
first axial inlet type cyclones that are vertically stacked in multiple rows and have inlets which open toward the mesh; and
second axial inlet type cyclones provided on one or more sides of the first axial inlet type cyclones, and having inlets and outlets which are oriented in a height direction of the dust collector.

2. The dust collector of claim 1, wherein
the first axial inlet type cyclones include air outlets and fine dust outlets that are open in a same direction, and
the inlets of the first axial inlet type cyclones is open opposite to the air outlets and the fine dust outlets.

3. The dust collector of claim 2, wherein the fine dust outlets of the first axial inlet type cyclones open in a ring shape around the air outlets.

4. The dust collector of claim 2, wherein each of the first axial inlet type cyclones includes:
a cylindrical body;
a vortex finder provided at an inlet side of the body, and provided with a cylindrical first surface and a conical second surface protruded from the first surface toward an outlet side of the body;
a vane formed between an outer circumferential surface of the first surface and an inner circumferential surface of the body, and extended in a spiral direction; and
an outlet partition provided at an outlet side of the cylindrical body, and configured to partition the air outlet and the fine dust outlet formed around the air outlet.

5. The dust collector of claim 4, further comprising:
a curved or planar body base; and
a curved or planar outlet base,
wherein the cylindrical bodies of the first axial inlet type cyclones protrude to extend from both sides of the body base, the outlet base is formed with a quantity of air vent holes corresponding to the first axial inlet type cyclones, and the outlet partitions are protruded from a circumference of the air vent hole toward an inside of the body.

6. The dust collector of claim 5, wherein
the outlet base includes a first outlet base and a second outlet base provided to face each other and to be spaced apart,
the dust collector further comprises two sidewalls provided to face each other and to be spaced apart, and configured to combine with the first outlet base and the second outlet base to form the sides of a polygonal pillar,
a rising flow path of air discharged from the first axial inlet type cyclones is formed in a cavity within the first outlet base, the second outlet base, and the two sidewalls, and
the rising flow path communicates with an outlet of the dust collector formed on an upper side of the housing.

7. The dust collector of claim 6, wherein the dust collector further comprises:
a first dust collection chamber formed in a ring shape inside the housing and formed to collect the dust from the cyclone;
a second dust collection chamber formed in a region surrounded by the first dust collection chamber, and formed to collect the fine dust from the axial inlet type cyclones; and
a lower block surface configured to partition the second dust collection chamber and the rising flow path to prevent fine dust collected in the second dust collection chamber from being scattered to the rising flow path, and
wherein the lower block surface is formed at a lower end of the first outlet base, the second outlet base, and the two sidewall.

8. The dust collector of claim 6, further comprising:
a mesh support surface formed to surround an upper rim of the mesh; and
an upper block surface formed at an upper end of the first outlet base, the second outlet base, and the two sidewalls,
wherein the upper block surface has a circular outer rim that is positioned adjacent to an inner circumferential surface of the mesh support surface, and partitions an inlet of the axial inlet type cyclones and a downstream side of the rising flow path to prevent the mixing of air introduced into the axial inlet type cyclones and air discharged through the rising flow path.

9. The dust collector of claim 8, wherein each of the second axial inlet type cyclones includes:
a casing;
a cylindrical vortex finder provided at an inlet side of the casing; and
a vane formed between an outer circumferential surface of the vortex finder and an inner circumferential surface of the casing, and extended in a spiral direction,
wherein the upper block surface is formed with a quantity of air vent holes corresponding to a quantity of the second axial inlet type cyclones, and the vortex finders of the second axial inlet type cyclones protrude from a circumference of an air vent hole formed on the upper block surface toward an inside of the casing.

10. The dust collector of claim 9, wherein the dust collector further comprises:
a first dust collection chamber formed in a ring shape inside the housing and configured to collect the dust from the cyclone;
a second dust collection chamber formed in a region surrounded by the first dust collection chamber, and configured to collect the fine dust from the axial inlet type cyclones; and
a second dust collection chamber top cover provided below the axial inlet type cyclones to partition an inlet side of the axial inlet type cyclones and the second dust collection chamber so as to prevent scattering of the fine dust collected in the second dust collection chamber, and
wherein a fine dust outlet of the second axial inlet type cyclones is formed on the second dust collection chamber top cover, and the casing is protruded from a circumference of the fine dust outlet formed on the second dust collection chamber top cover toward the upper block surface.

11. The dust collector of claim 8, further comprising:
a first dust collection chamber formed in a ring shape inside the housing and configured to collect the dust from the cyclone;

a second dust collection chamber formed in a region surrounded by the first dust collection chamber, and formed to collect the fine dust from the axial inlet type cyclones; and a second dust collection chamber top cover provided below the axial inlet type cyclones to partition an inlet side of the axial inlet type cyclones and the second dust collection chamber so as to prevent scattering of the fine dust collected in the second dust collection chamber, and wherein a hole to receive the first dust discharged from the first axial inlet type cyclones is formed on the second dust collection chamber top cover.

12. The dust collector of claim 6, wherein
the mesh is provided in an inner region of the housing,
the axial inlet type cyclones are provided in an inner region of the mesh, and
the rising flow path is formed in a region surrounded by the first axial inlet type cyclones and the second axial inlet type cyclones.

13. The dust collector of claim 6, wherein the body is divided into an inlet side toward the mesh and an outlet side toward the rising flow path with respect to the body base, and
the dust collector further comprises a rim surface extended from the body base toward the outlet side direction to surround the outlet side of the body.

14. The dust collector of claim 13, wherein the rim surface is provided adjacent to the outlet base to seal a portion of a remaining rim that excludes a lower edge of the outlet base.

15. The dust collector of claim 5, wherein the dust collector further includes:

a first dust collection chamber formed in a ring shape inside the housing and configured to collect the dust from the cyclone; and a second dust collection chamber surrounded by the first dust collection chamber, and configured to collect the fine dust from the axial inlet type cyclones, and wherein an end portion of the outlet side of the body and the outlet base are spaced apart from each other to form a fine dust falling flow path communicating with the second dust collection chamber.

16. The dust collector of claim 15, wherein the air outlets and the fine dust falling flow path are alternately formed along the outlet base.

17. The dust collector of claim 1, wherein each of the first axial inlet type cyclones include an air outlet and a fine dust outlet that are open toward different directions, and
the inlets of the first axial inlet type cyclones are open in a same direction as the air outlets and opposite to the fine dust outlets.

18. The dust collector of claim 17, wherein the inlets and the air outlets of the second axial inlet type cyclones are open toward an upper side of the dust collector, and the fine dust outlets of the first axial inlet type cyclones are open toward a lower side of the dust collector.

19. The dust collector of claim 1, wherein a difference between a stack height of the first axial inlet type cyclones and a height of the second axial inlet type cyclones is smaller than an outer diameter of the first axial inlet type cyclones.

20. The dust collector of claim 1, wherein the second axial inlet type cyclones are connected to each other along a direction parallel to an axial direction of the first axial inlet type cyclones.

* * * * *